US012118845B2

(12) United States Patent
Umeda

(10) Patent No.: US 12,118,845 B2
(45) Date of Patent: Oct. 15, 2024

(54) DISK FEEDING DEVICE

(71) Applicant: ASAHI SEIKO CO., LTD., Tokyo (JP)

(72) Inventor: Masayoshi Umeda, Saitama (JP)

(73) Assignee: ASAHI SEIKO CO., LTD., Tokyo (JP)

( * ) Notice: Subject to any disclaimer, the term of this patent is extended or adjusted under 35 U.S.C. 154(b) by 713 days.

(21) Appl. No.: 17/299,154

(22) PCT Filed: Sep. 5, 2019

(86) PCT No.: PCT/JP2019/034959
§ 371 (c)(1),
(2) Date: Jun. 2, 2021

(87) PCT Pub. No.: WO2020/115975
PCT Pub. Date: Jun. 11, 2020

(65) Prior Publication Data

US 2022/0036683 A1 Feb. 3, 2022

(30) Foreign Application Priority Data

Dec. 4, 2018 (JP) ................................ 2018-226971

(51) Int. Cl.
*G07D 3/12* (2006.01)
*G07D 1/00* (2006.01)
*G07D 9/00* (2006.01)

(52) U.S. Cl.
CPC ............... *G07D 3/128* (2013.01); *G07D 1/00* (2013.01); *G07D 9/008* (2013.01); *G07D 2201/00* (2013.01)

(58) Field of Classification Search
CPC .. G07D 1/00; G07D 3/00; G07D 3/06; G07D 3/08; G07D 3/128; G07D 5/00;
(Continued)

(56) References Cited

U.S. PATENT DOCUMENTS 2,846,769 A * 8/1958 Colont .................... G01B 3/28
33/710
6,059,651 A * 5/2000 Abe ........................ G07D 1/00
221/267
(Continued)

FOREIGN PATENT DOCUMENTS

JP 2002-123851 4/2002
JP 3104019 6/2004
(Continued)

OTHER PUBLICATIONS

Official Communication issued in International Patent Application No. PCT/JP2019/034959, dated Oct. 15, 2019.
(Continued)

*Primary Examiner* — Jeffrey A Shapiro
(74) *Attorney, Agent, or Firm* — GREENBLUM & BERNSTEIN, P.L.C.

(57) ABSTRACT

Provided are a holding body that holds a guide roller and locking position changing means for changing a locking position of the holding body with respect to a base body along a track in a circumferential direction centered on a rotation axis of a rotary disk, the locking position changing means including a first tooth row and a second tooth row, and the like that mesh with each other. In the configuration, since a feeding roller with which a coin collides is smoothly moved in a forward movement direction regardless of a distance between the feeding roller and a guide roller (regardless of a size of the coin), occurrence of the coin jam due to a movement failure of the feeding roller can be suppressed.

7 Claims, 18 Drawing Sheets

(58) Field of Classification Search
CPC ...... G07D 9/06; G07D 2201/00; G07D 9/008; G07D 3/14; G07F 9/08
USPC .... 453/6, 10, 12, 13, 33–35, 49, 50, 52, 53, 453/57
See application file for complete search history.

(56) References Cited

U.S. PATENT DOCUMENTS

| | | | | |
|---|---|---|---|---|
| 6,093,094 | A | 7/2000 | Uecker et al. | |
| 6,131,625 | A * | 10/2000 | Casanova | G07D 9/00 453/63 |
| 7,244,176 | B2 * | 7/2007 | Chang | G07D 9/008 453/18 |
| 7,922,569 | B2 * | 4/2011 | Li | G07D 9/04 453/57 |
| 9,105,140 | B2 * | 8/2015 | Enomoto | G07D 3/06 |
| 2005/0227604 | A1 | 10/2005 | Chang | |
| 2015/0024668 | A1 | 1/2015 | Umeda | |

FOREIGN PATENT DOCUMENTS

| | | |
|---|---|---|
| JP | 2009-230617 | 10/2009 |
| JP | 2015-022597 | 2/2015 |
| JP | 2018-013864 | 1/2018 |
| TW | M252089 | 12/2004 |

OTHER PUBLICATIONS

U.S. Appl. No. 17/298,851 to Korenaga, filed Jun. 1, 2021.
Official Communication Received in European Patent Application No. 19892053.0, dated Jul. 8, 2022.
Official Communication Received in Taiwan Patent Application No. 108139853 dated Jun. 7, 2023.

* cited by examiner

[FIG. 1]
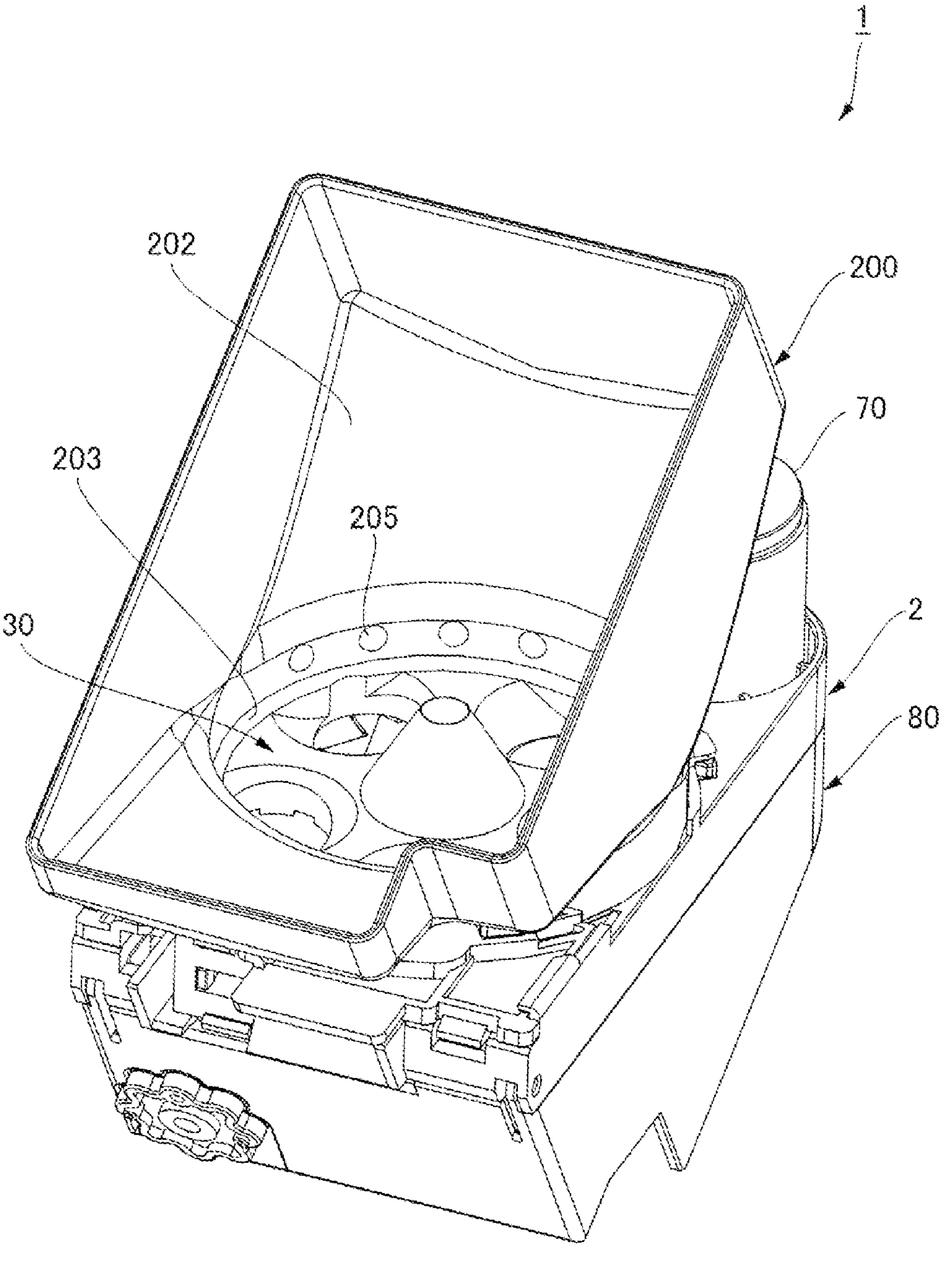

[FIG. 2]
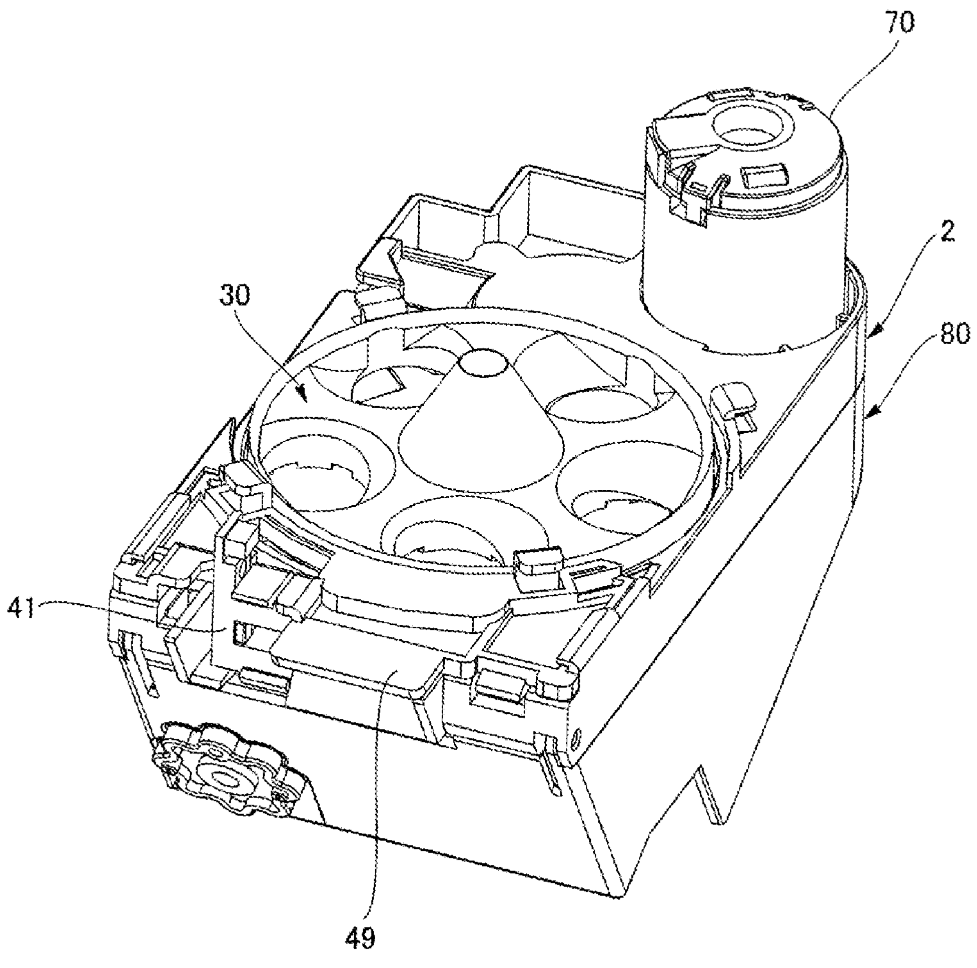

[FIG. 3]
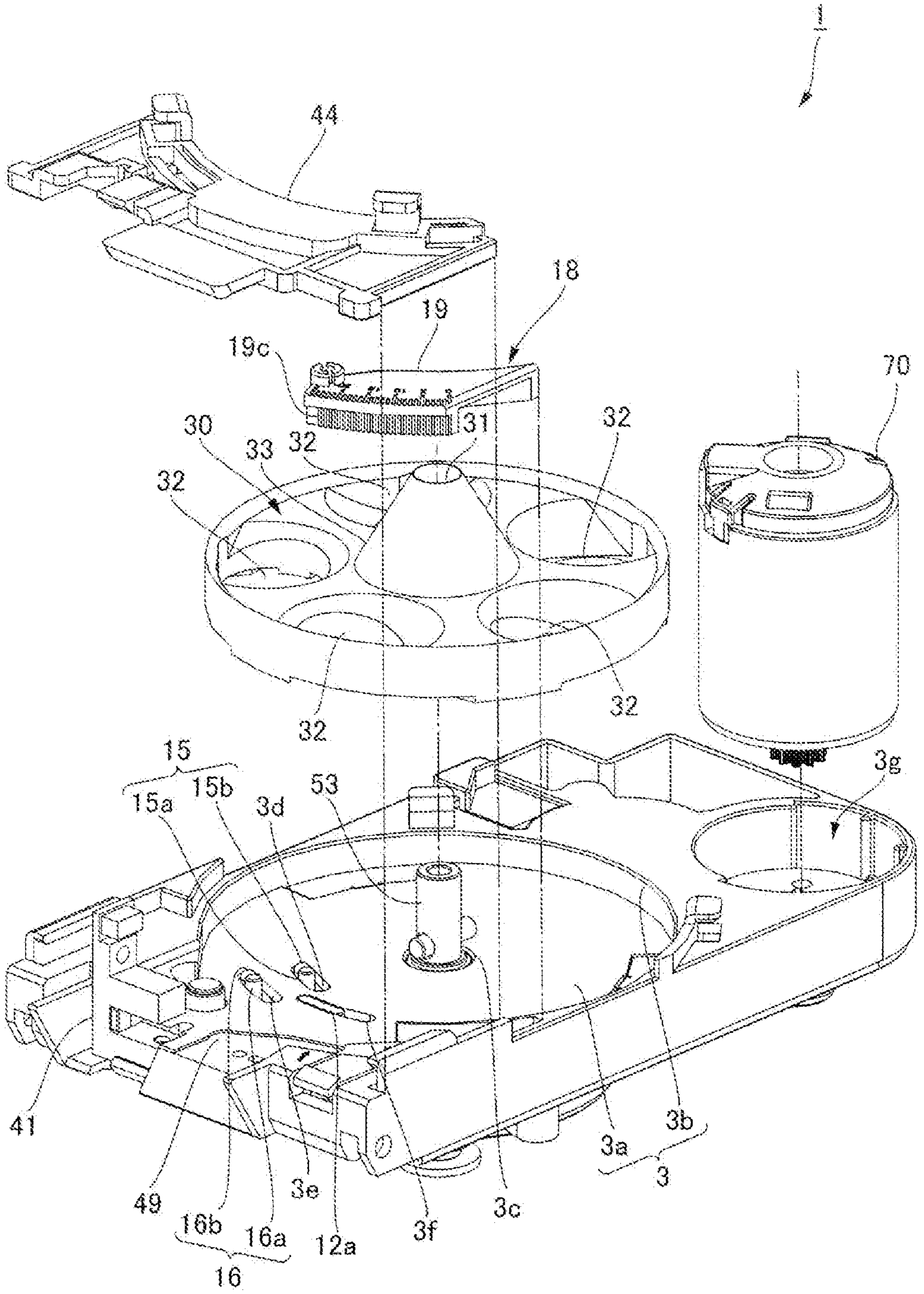

[FIG. 4]
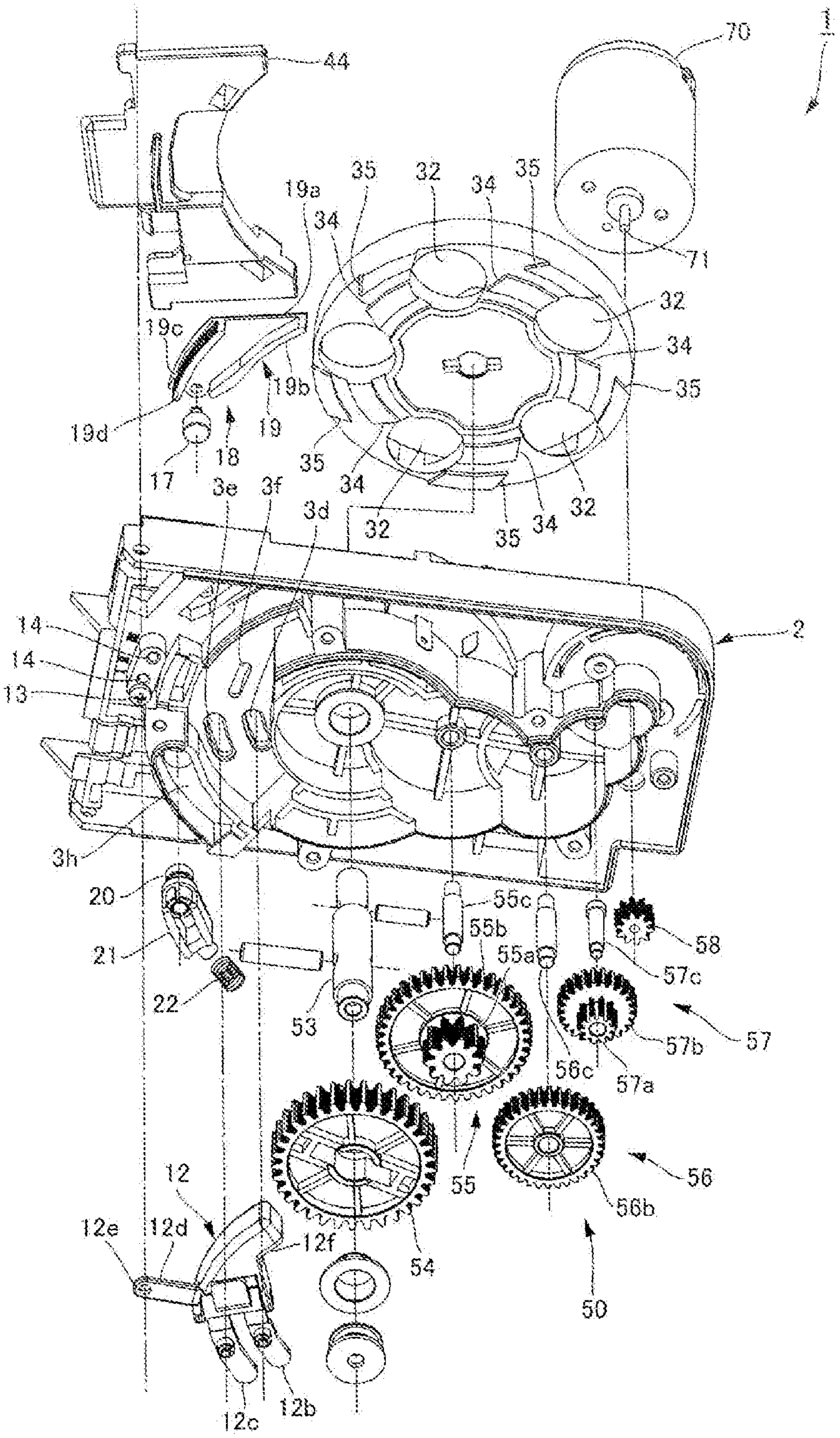

[FIG. 5]
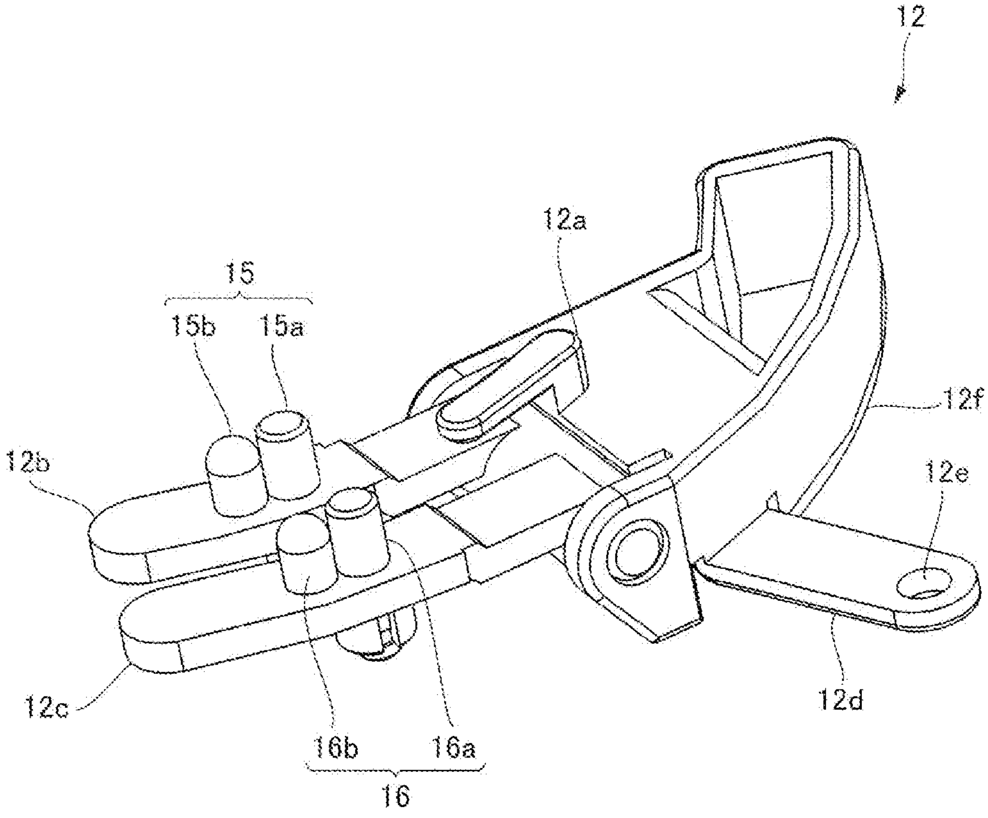

[FIG. 6 A]
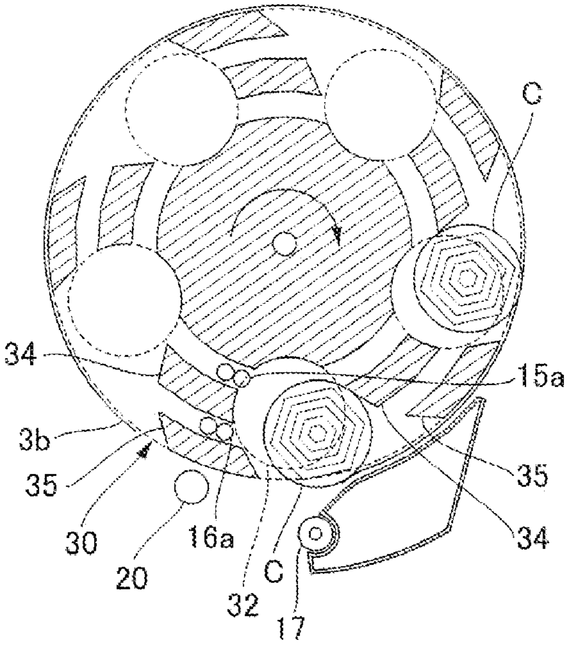
[FIG. 6 B]
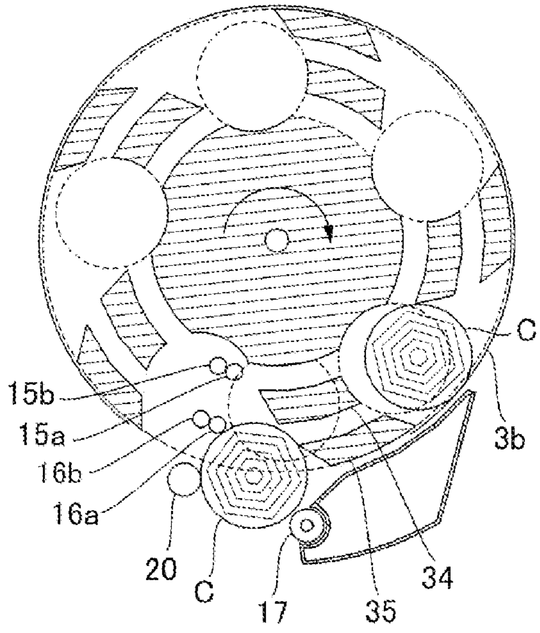

[FIG. 6 C]
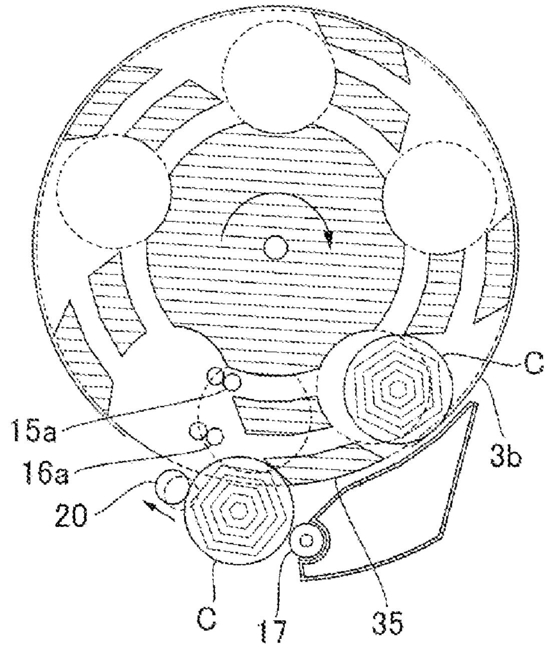
[FIG. 6 D]
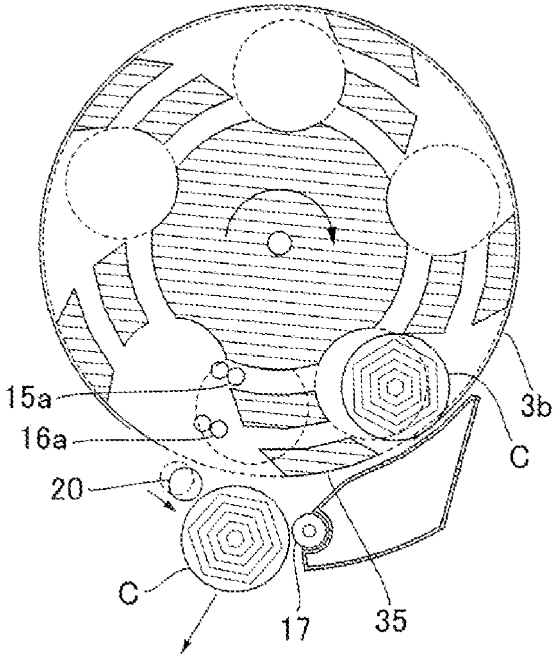

[FIG. 7]
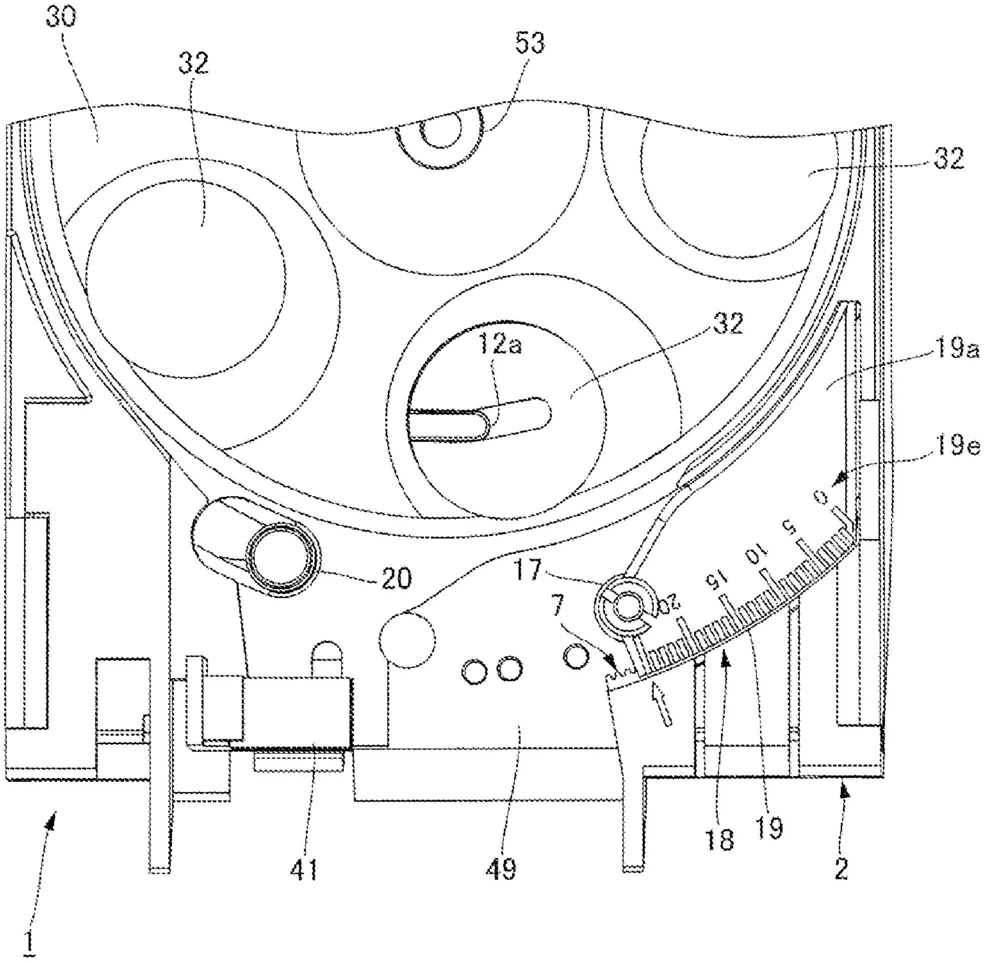

[FIG. 8]
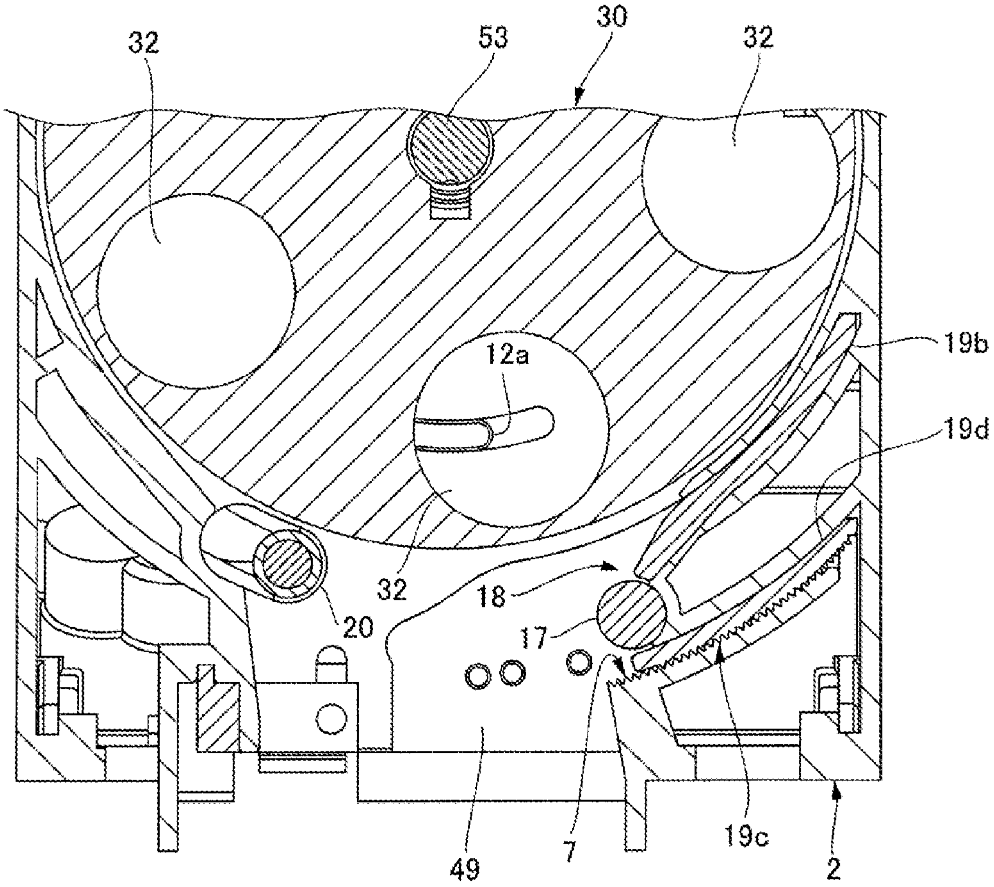

[FIG. 9]
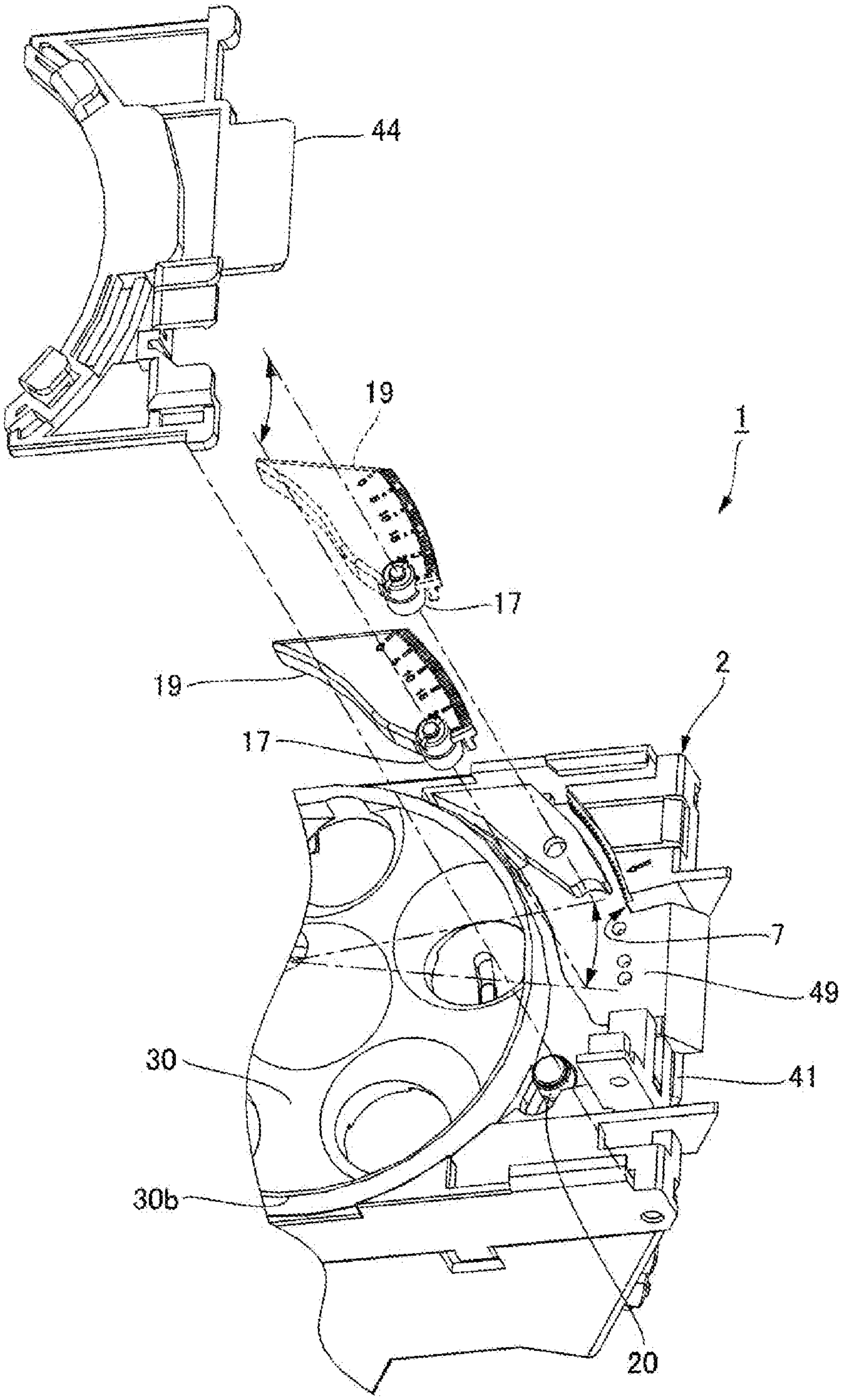

[FIG. 1 0]
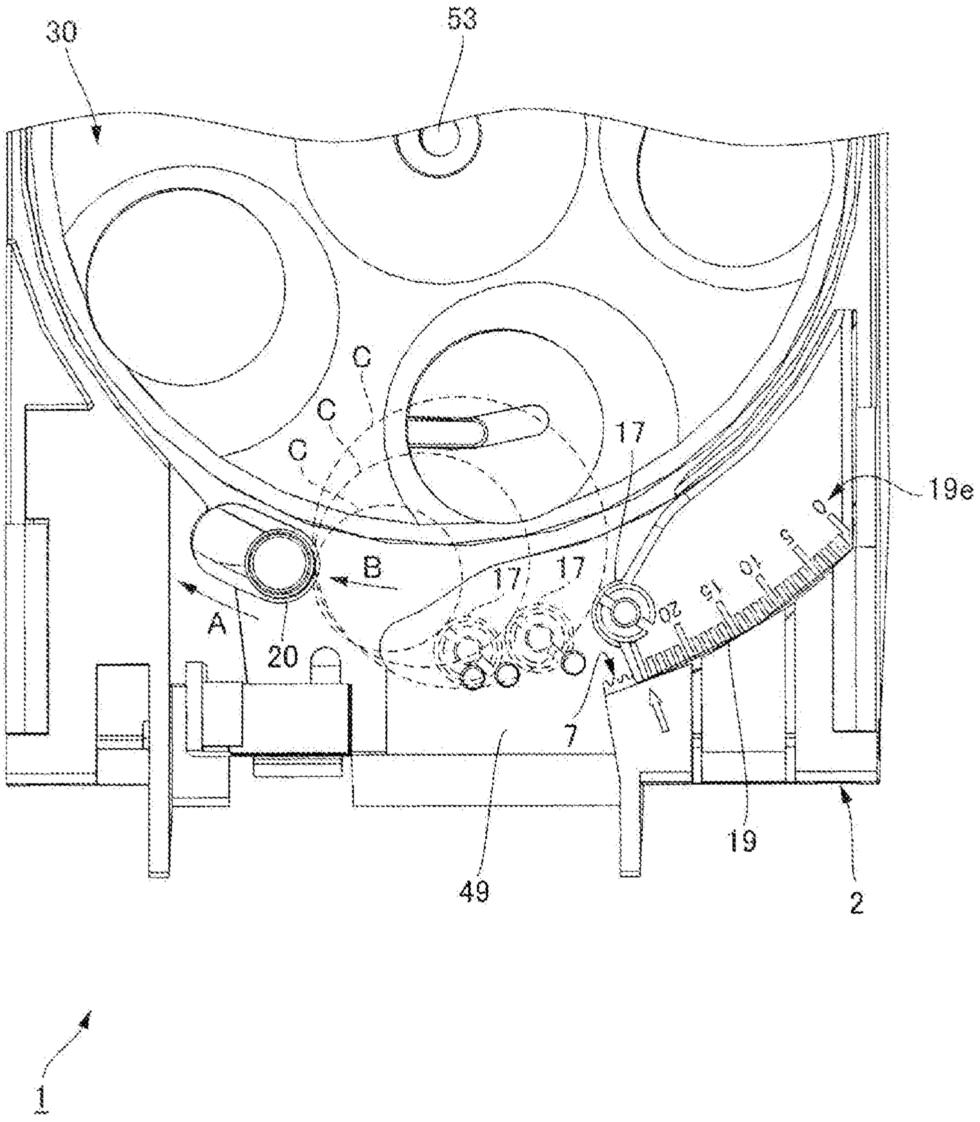

[FIG. 1 1]
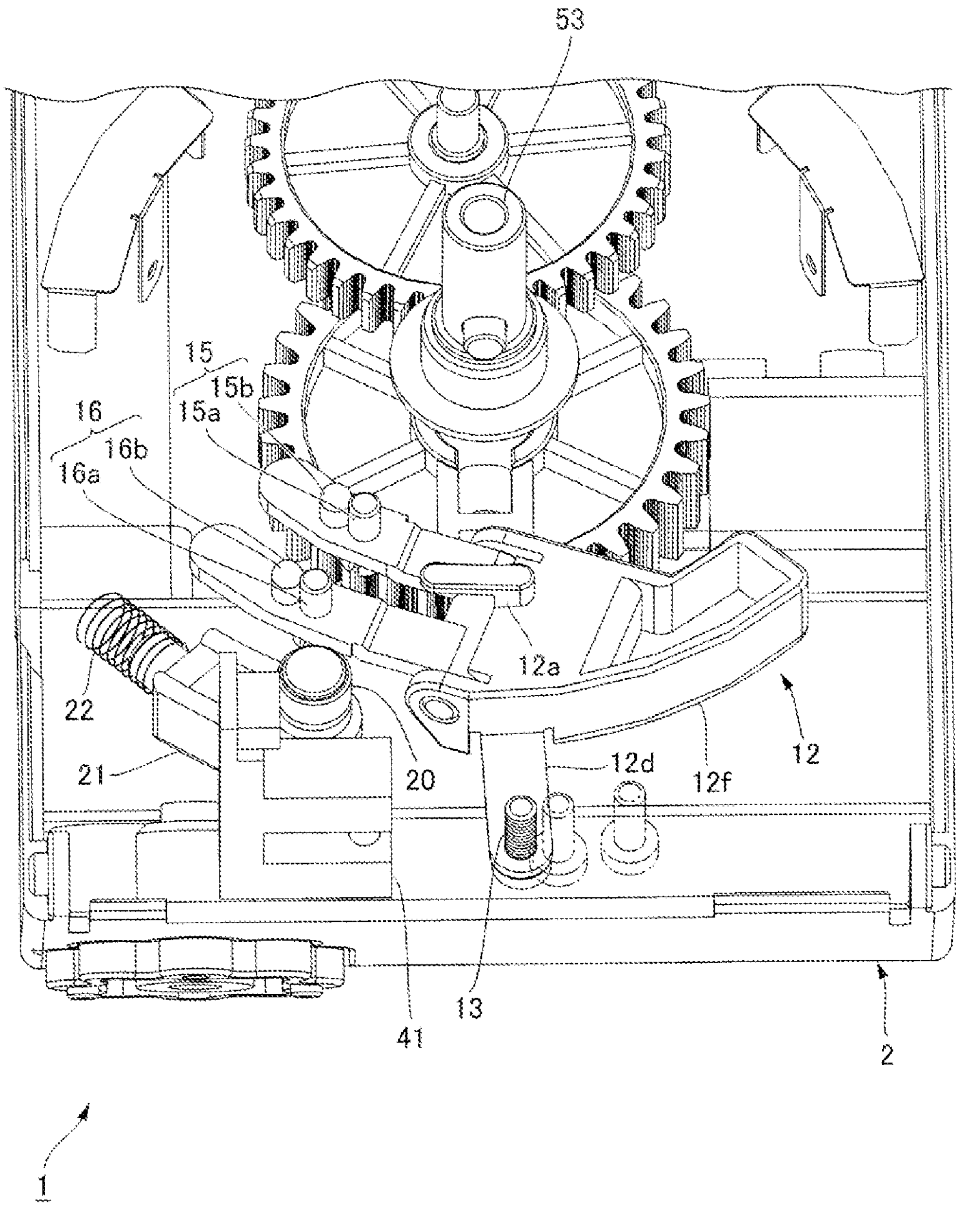

[FIG. 1 2]
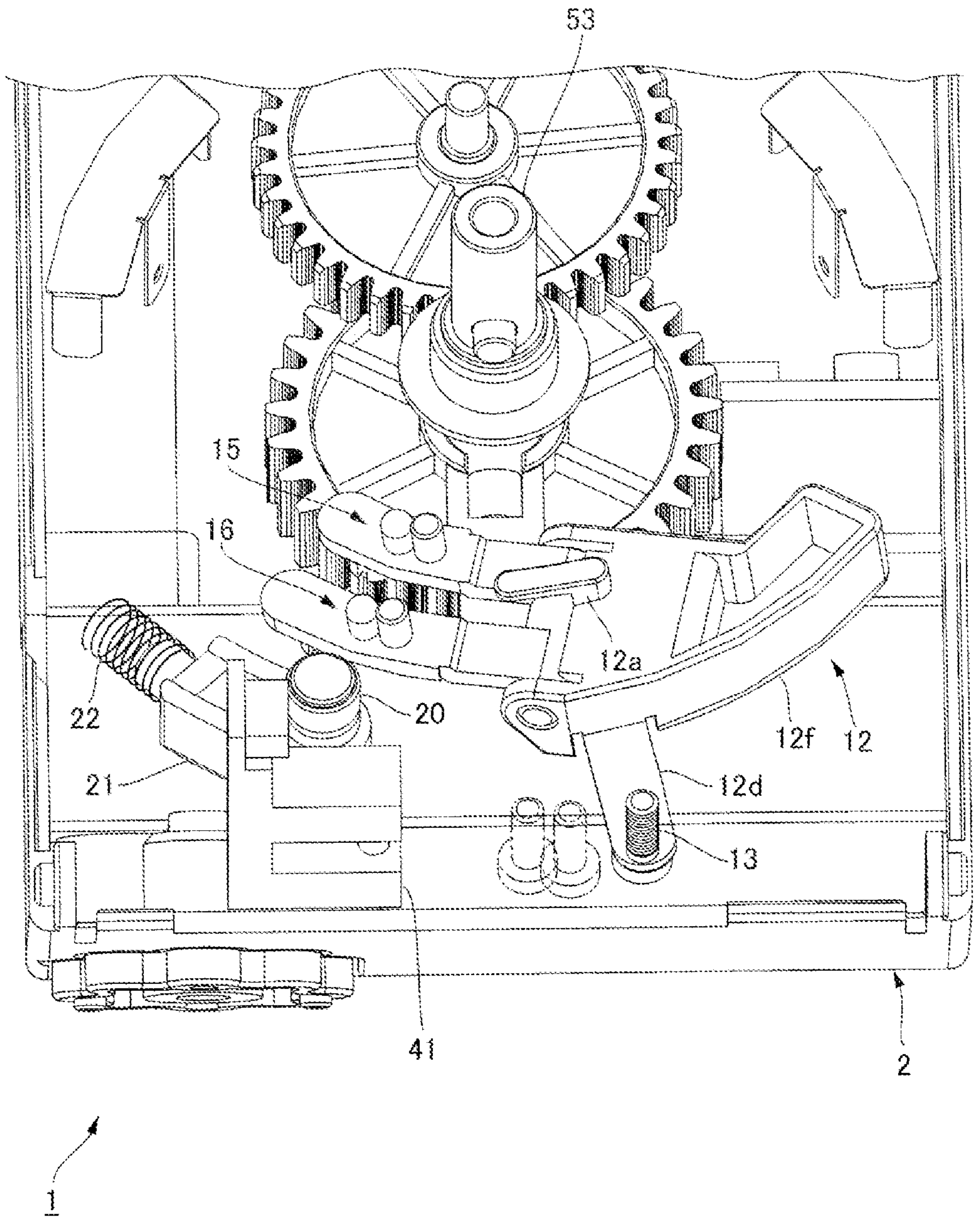

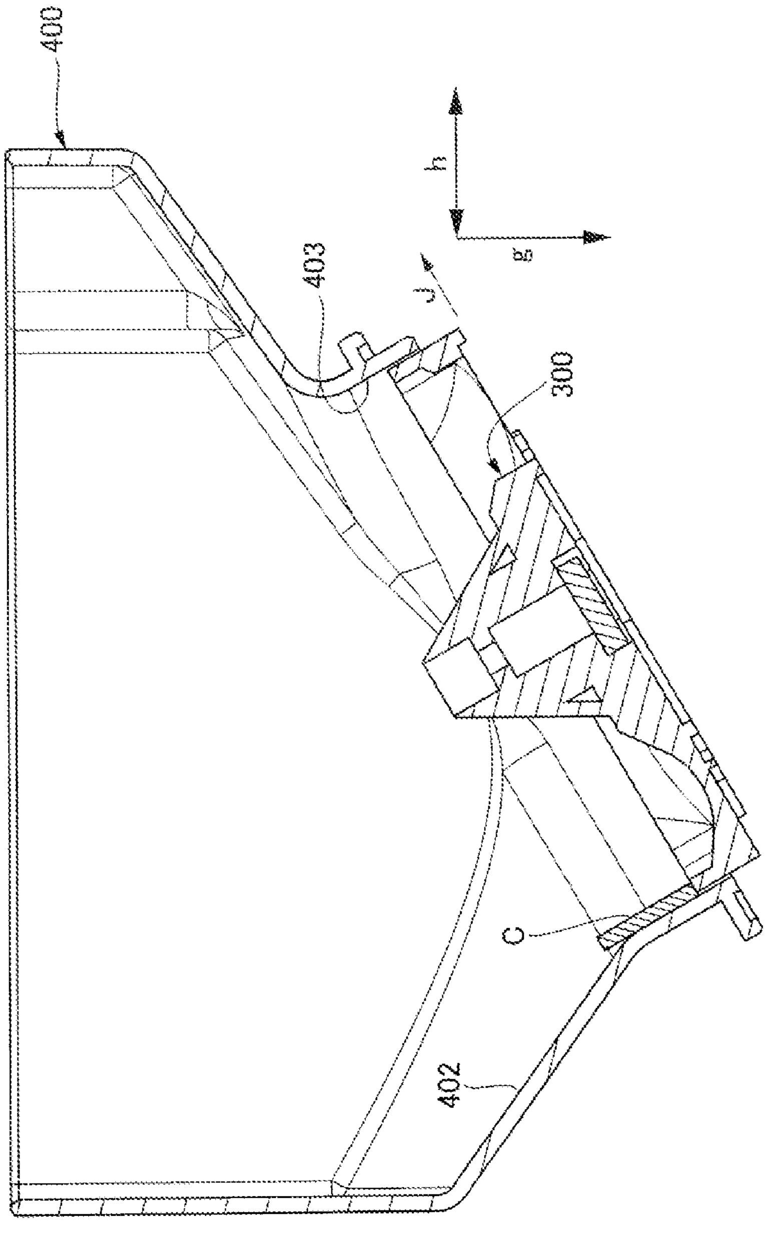
[FIG. 13]

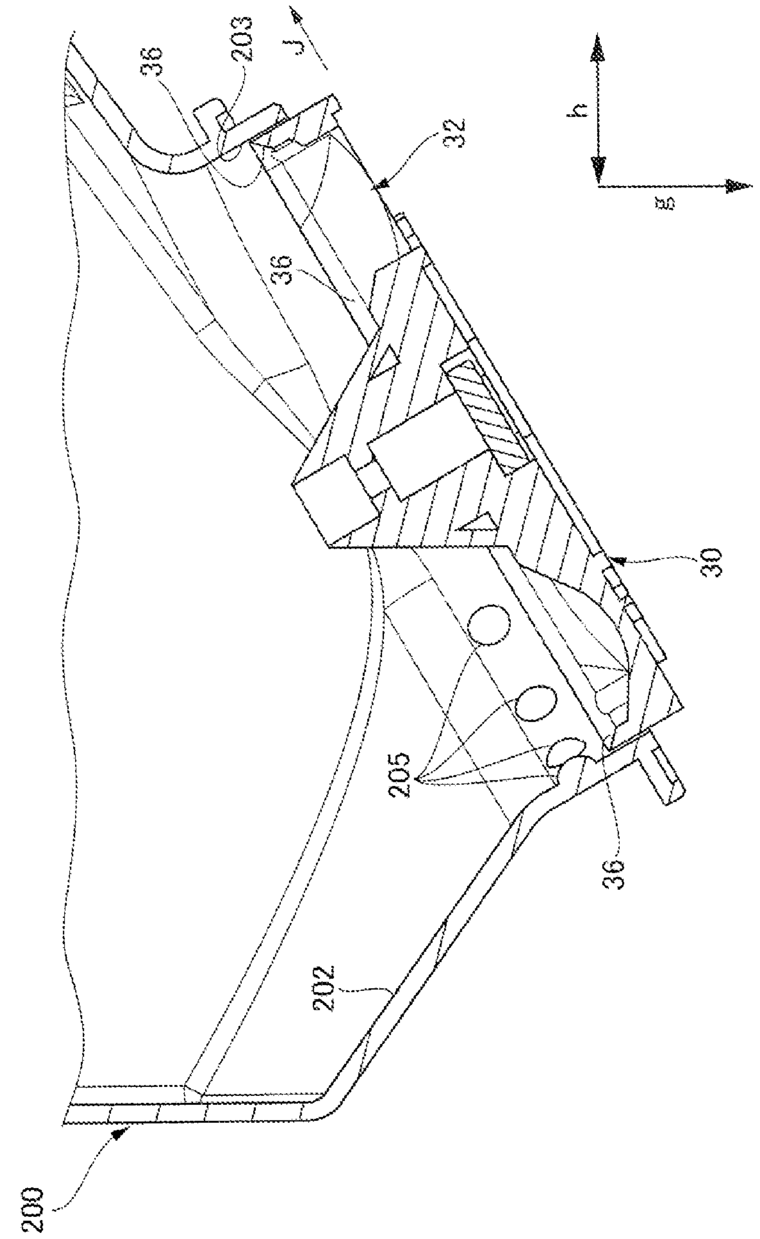
[FIG.14]

[FIG. 1 5]
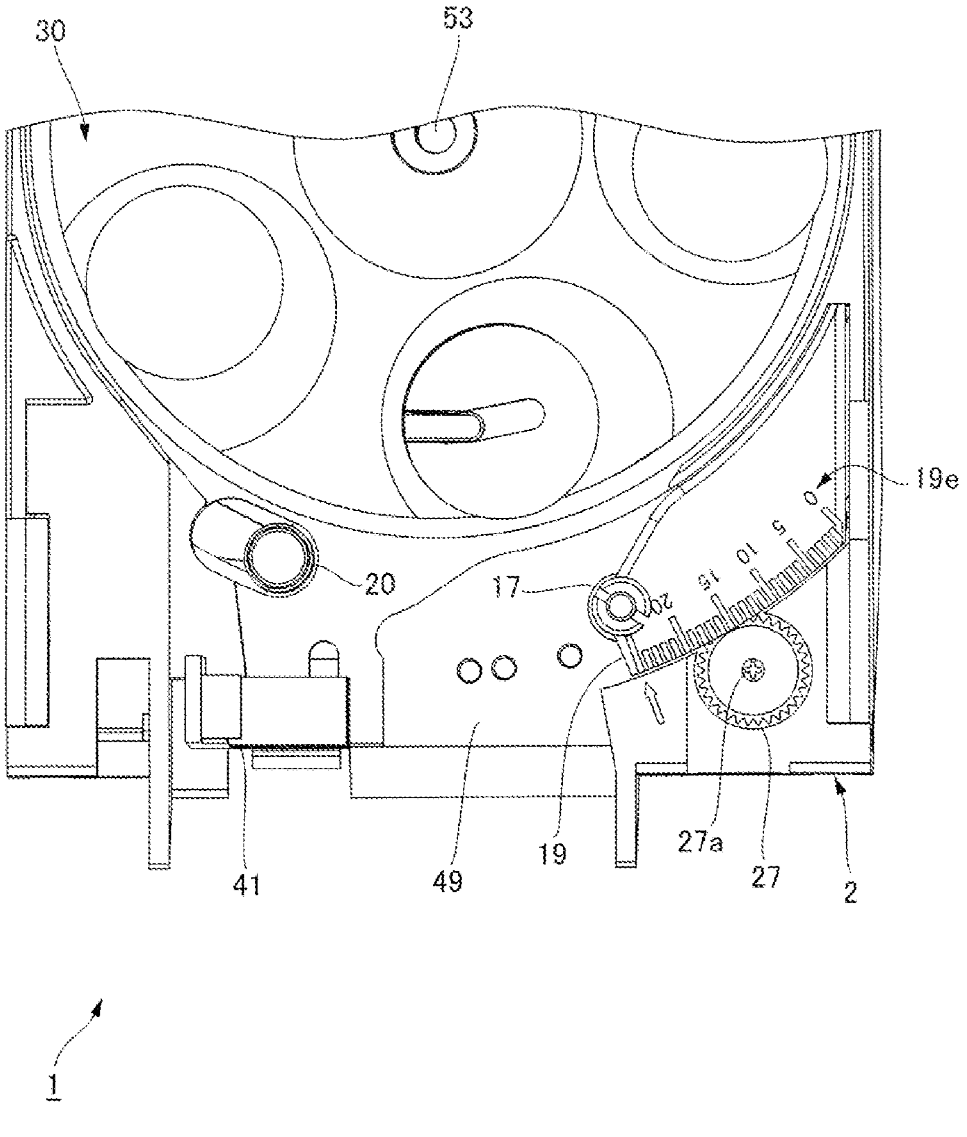

[FIG. 1 6]
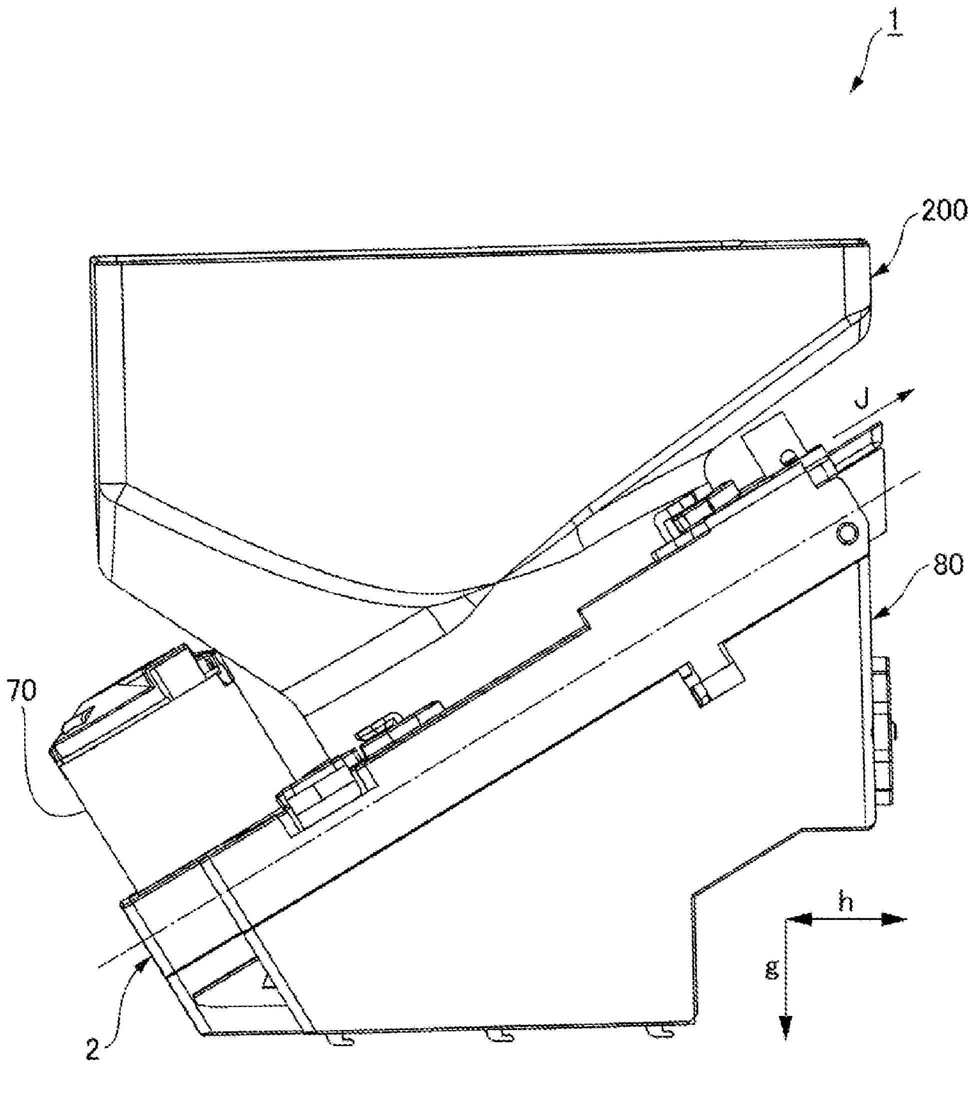

[FIG. 1 7]
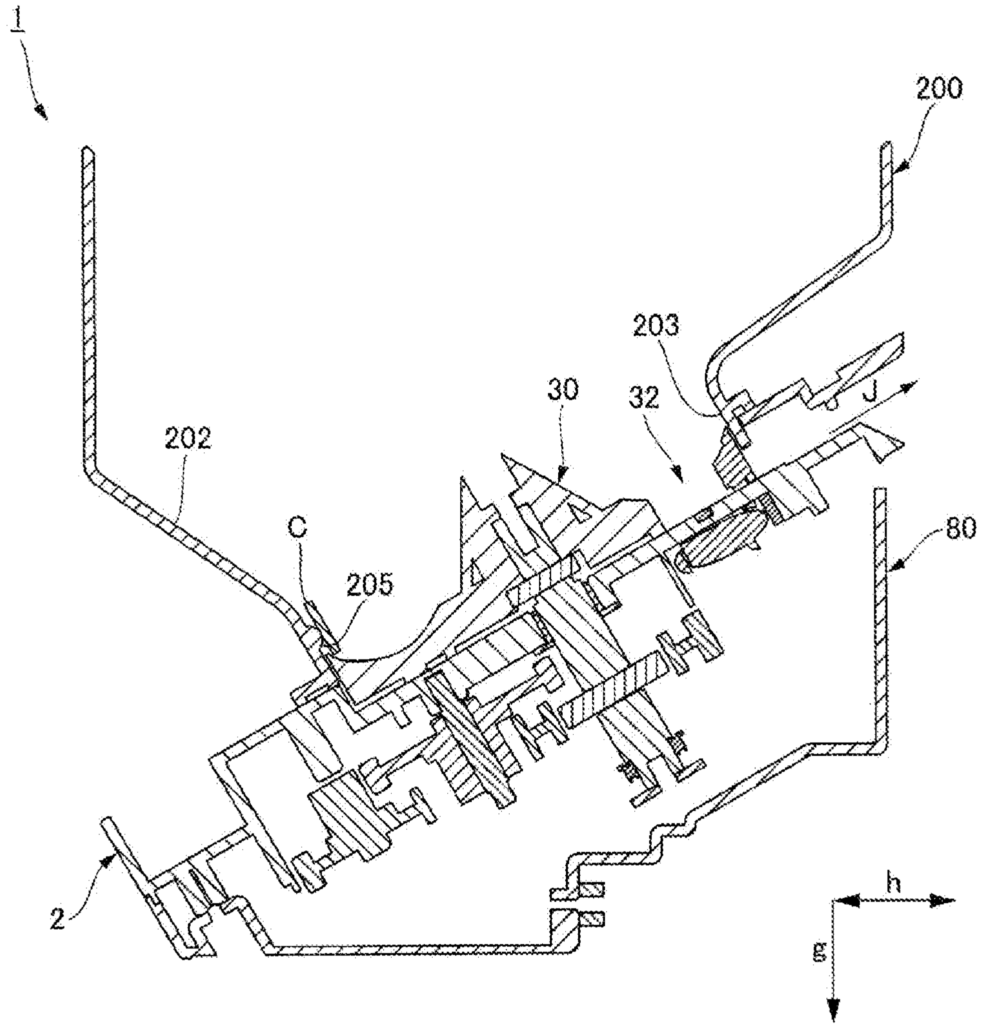

DISK FEEDING DEVICE

TECHNICAL FIELD

The present invention relates to a disk feeding device that feeds a disk such as a coin or a medal.

BACKGROUND ART

In the related art, there is known a disk feeding device including a base body, a storage portion that stores a disk, a rotatable rotary member, a feeding passage through which the disk fed toward an outside of the device passes, and a guide member and a feeding member that face each other via the feeding passage.

For example, a coin output device as a disk feeding device described in Patent Literature 1 includes a base as a base body, a coin collecting funnel as a storage portion that stores a disk-like coin, a rotary disk as a rotary member, guide means as a guide member, and a moving part as a feeding member. The coin is ejected outside the device through a passage between a cylindrical moving part and plate-like guide means. The moving part and the guide means face each other via the aforementioned passage. The rotatable rotary disk includes a circular coin placing hole penetrating in a thickness direction, and a push-up part, and the coin is dropped on an upper surface of the base from the coin placing hole after the coin fed from the coin collecting funnel is caught in the coin placing hole. The rotary disk pushes and moves the coin dropped on the upper surface of the base in a rotation direction by the push-up part protruding downward from a lower surface of the rotary disk. The guide means brings a guide side into contact with the coin pushed by the push-up part to guide the coin toward the above-described passage at a position on an upstream side of the rotary disk in a rotation direction from the moving part. The moving part can reciprocate in a direction in which a distance from the guide means is changed, and the moving part ejects the coin pinched between the moving part and the guide side of the guide means along the passage by a biasing force of a spring while being biased toward the guide means by the spring.

When changing a size of the coin to be set in the coin output device, a user needs to change a distance between the moving part and the guide means in accordance with the size of the coin. In the coin output device described in Patent Literature 1, the user can change the distance between the moving part and the guide means by rotating the guide means about an axis to change an orientation of the guide means.

CITATION LIST

Patent Literature

Patent Literature 1: Japanese Registered Utility Model No. 3104019

SUMMARY OF INVENTION

Technical Problem

However, in this coin output device, as the orientation of the guide means changes, a direction in which the guide side of the guide means extends, that is, a direction in which the coin is guided by the guide side changes. When the orientation of the guide means is set in accordance with a large-size coin, the direction in which the coin is guided by the guide side becomes a direction substantially orthogonal to the movement direction of the moving part. When the coin moving in this direction collides with the moving part, there is a problem that the moving part as the feeding member does not satisfactorily move in a movable direction and a coin jam is easily caused.

The present invention has been made in view of the above-described background, and an object of the present invention is to suppress occurrence of a disk jam caused by movement failure of the feeding member.

Solution to Problem

According to a first aspect of the present invention, there is provided a disk feeding device including: a base body; a storage portion that stores a disk; a rotary member that is disposed in the base body and is rotatable; a feeding passage that is provided in the base body and through which the disk fed toward an outside of a device passes; and a guide member and a feeding member that face each other via the feeding passage, the rotary member including a circular through hole that penetrates in a rotation axis direction and a push portion that pushes the disk in a rotation direction to move the disk, and moving the disk that is sent to the rotary member from the storage portion and passes through the through hole with the push portion in the rotation direction, the guide member guiding the disk moved to a predetermined position of the rotation direction toward the feeding passage, the feeding member being capable of reciprocating in a direction in which a distance from the guide member is changed, and feeding the disk pinched between the feeding member and the guide member by a biasing force of a biasing member while being biased toward the guide member by the biasing member, the disk feeding device including: a holding body that holds the guide member; and locking position changing means for changing a locking position of the holding body with respect to the base body along a track in a circumferential direction centered on the rotation axis.

Advantageous Effects of Invention

According to the present invention, it is possible to exhibit an excellent effect of suppressing the occurrence of the disk jam caused by the movement failure of the feeding member.

BRIEF DESCRIPTION OF DRAWINGS

FIG. 1 is a perspective view illustrating a coin hopper according to an embodiment when viewed from above.

FIG. 2 is a perspective view illustrating the coin hopper in a state in which a hopper head is removed.

FIG. 3 is an exploded perspective view illustrating a part of the coin hopper when viewed from obliquely above.

FIG. 4 is an exploded perspective view illustrating a part of the coin hopper when viewed from obliquely below.

FIG. 5 is a perspective view illustrating a pin bracket of the coin hopper.

FIG. 6A is a plane cross-sectional view for explaining behavior of a coin with a rotation of a rotary disk of the coin hopper.

FIG. 6B is a plane cross-sectional view for explaining behavior of a coin with a rotation of the rotary disk, and illustrates a state in which the rotation of the rotary disk has progressed more than that in FIG. 6A.

FIG. 6C is a plane cross-sectional view for explaining behavior of a coin with a rotation of the rotary disk, and illustrates a state in which the rotation of the rotary disk has progressed more than that in FIG. 6B.

FIG. 6D is a plane cross-sectional view for explaining behavior of a coin with a rotation of the rotary disk, and illustrates a state in which the rotation of the rotary disk has progressed more than that in FIG. 6C.

FIG. 7 is a plan view illustrating one end portion of the coin hopper in a longitudinal direction in a state in which a hopper head is removed.

FIG. 8 is a plane cross-sectional view illustrating one end portion of the coin hopper in a longitudinal direction.

FIG. 9 is an exploded perspective view illustrating one end portion of the coin hopper in a longitudinal direction in a state in which a hopper head is removed.

FIG. 10 is a plan view for explaining a relationship between a position of a guide roller and a direction in which a coin guided by the guide roller collides with a feeding roller, in the coin hopper.

FIG. 11 is a perspective view for explaining a first example of an attachment state of a pin bracket in the coin hopper.

FIG. 12 is a perspective view for explaining a second example of an attachment state of the pin bracket.

FIG. 13 is a cross-sectional view illustrating a hopper head and a rotary disk of a coin hopper of a comparative example.

FIG. 14 is a cross-sectional view illustrating a hopper head and a rotary disk of a coin hopper according to an embodiment.

FIG. 15 is a plan view illustrating one end portion of a coin hopper according to a modification example in a longitudinal direction.

FIG. 16 is a side view illustrating a coin hopper according to an embodiment.

FIG. 17 is a cross-sectional view illustrating the coin hopper.

DESCRIPTION OF EMBODIMENTS

Hereinafter, as a disk feeding device to which the present invention is applied, an embodiment of a coin hopper that feeds a disk-like coin will be described. In the following drawings, scales, numbers, and the like in each structure may be different from those of an actual structure in order to facilitate understanding of each structure. In order to facilitate understanding of a portion to be described, a description of reference numerals in a non-target portion may be omitted.

FIG. 1 is a perspective view illustrating a coin hopper 1 according to an embodiment when viewed from above. FIG. 2 is a perspective view illustrating the coin hopper 1 in a state in which a hopper head 200 as a storage portion is removed. The coin hopper 1 includes a base body 2, a hopper head 200, a rotary disk 30 as a rotary member, and a pedestal 80. The hopper head 200 is attached to an upper surface of the base body 2. At a bottom portion of the hopper head 200, a taper 202 and a circular opening 203 connected to a lower end of the taper 202 are provided. The circular opening 203 faces the rotary disk 30 disposed on the base body 2 in a vertical direction.

Coins are stored in a bulk state in the hopper head 200, and some coins are stacked on the rotary disk 30 through the circular opening 203 described above. The coins placed on an upper surface of the rotary disk 30 are sorted one by one by a rotation of the rotary disk 30, and are fed from a feeding passage to be described later. An upper portion of the feeding passage is covered by a passage cover (44 in FIG. 3 which will be described later). Examples of the coins include money, scrip money such as a token, a medal used in a game machine, other pseudo money, and the like. A shape of a plane cross section of the disk set in the disk feeding device according to the present invention is not limited to a perfect circle. A flat body having an elliptical plane cross section, a flat body having a polygonal (for example, a heptagon or a dodecagon) plane cross section, and the like can also be a disk to be set in the disk feeding device according to the present invention.

The pedestal 80 covers a drive unit (50 in FIG. 4 to be described later) provided on a lower surface side of the base body 2 while supporting the base body 2 from below.

FIG. 3 is an exploded perspective view illustrating a part of the coin hopper 1 when viewed from obliquely above. A circular recess 3 including a circular bottom surface 3*a* and a circumferential wall 3*b* rising from an outer edge of the bottom surface 3*a* is provided on an upper surface of the flat rectangular parallelepiped base body 2. On the bottom surface 3*a* of the circular recess 3, a central through hole 3*c* is provided at a center of the circle, and a first elongated hole 3*d*, a second elongated hole 3*e*, and a position guide hole 3*f* are provided at positions shifted from the center of the circle. A drive shaft 53 of the drive unit passes through the central through hole 3*c* from the lower surface side of the base body 2. A first pin unit 15 including a first regulation pin 15*a* and a first riding pin 15*b* passes through the first elongated hole 3*d* from the lower surface side of the base body 2 and protrudes upward from the bottom surface 3*a*. A second pin unit 16 including a second regulation pin 16*a* and a second riding pin 16*b* passes through the second elongated hole 3*e* from the lower surface side of the base body 2 and protrudes upward from the bottom surface 3*a*. A guided portion 12*a* of a pin bracket to be described later is inserted into the position guide hole 3*f* from the lower surface side of the base body 2.

The circumferential wall 3*b* of the circular recess 3 is not connected over the entire circumference, and includes an opening portion in a predetermined region in a circumferential direction. The circumferential wall 3*b* guides the movement of the coins in the circumferential direction (rotation direction of the rotary disk 30).

The disk-like rotary disk 30 is disposed in the circular recess 3 of the base body 2 and is rotated about the drive shaft 53. A clockwise direction in FIG. 3 is a normal rotation direction of the rotary disk 30, and a counterclockwise direction is a reverse rotation direction of the rotary disk 30. As the rotary disk 30 rotates in the normal rotation direction, the coins are fed one by one from a feeding passage 49 provided at one end portion of the upper surface of the base body 2 in a longitudinal direction.

Hereinafter, a radial direction of the circle centered on a rotation axis of the rotary disk 30 is simply referred to as a radial direction. In the radial direction, a side close to the rotation axis of the rotary disk 30 is referred to as an inner side. In the radial direction, a side away from the rotation axis of the rotary disk 30 is referred to as an outer side.

The rotary disk 30 includes a center hole 31 provided at a center, five coin catching holes 32 arranged in the rotation direction at positions on the outer side of the center hole 31 in the radial direction, and a conical central convex portion 33 provided on the upper surface so as to surround the center hole 31. The central convex portion 33 stirs the coins placed on the rotary disk 30.

The drive shaft 53 of the drive unit passes through the center hole 31 to rotate the rotary disk 30. The coin catching holes 32 penetrating in a disk thickness direction (rotation axis direction) catch the coins placed on the rotary disk 30 in an orientation parallel to the bottom surface 3*a*. A circumferential wall surface of the coin catching holes 32 has a tapered shape expanding upward, and makes it easy to drop the coins into the coin catching holes 32.

A circular recess 3*g* is provided at the other end portion of the upper surface of the base body 2 in the longitudinal direction. A motor 70 is fixed to the base body 2 in a state in which a distal end portion of the motor 70 is inserted into the circular recess 3*g*. A holding unit 18 is fixed to the upper surface of the base body 2, and the holding unit 18 will be described in detail later.

A coin detection sensor 41 including a transmission type optical sensor is disposed at one end portion of the feeding passage 49 in a width direction. The coin detection sensor 41 includes a light receiving element disposed on a floor surface side of the feeding passage 49 and a light emitting element disposed on a top surface side, and detects the coins in the feeding passage 49 when an optical path from the light emitting element to the light receiving element is blocked by the coins.

Although an example in which the circular recess 3 is provided on the upper surface of the base body 2 has been described, the circular recess 3 may be provided on a member fixed to the upper surface of the base body 2. A lower end portion of the hopper head 200 may function as a circular recess.

FIG. 4 is an exploded perspective view illustrating a part of the coin hopper 1 when viewed from obliquely below. On the lower surface of the rotary disk 30, a first push body 34 and a second push body 35 are provided in a vicinity of each of the five coin catching holes 32. The first push body 34 and the second push body 35 protrude downward from the lower surface of the rotary disk 30. The first push body 34 is positioned on an inner side from the second push body 35 in the radial direction. Each of the first push body 34 and the second push body 35 pushes the coins in the normal rotation direction with a side surface on a downstream side of the normal rotation direction. The side surfaces of the first push body 34 and the second push body 35 are positioned on an involute curve extending outward in the radial direction from the center of the rotary disk 30 in a plan view.

In FIG. 3, the coins caught by the coin catching holes 32 do not stay in the coin catching holes 32, pass through the coin catching holes 32, and fall to the bottom surface 3*a* of the circular recess 3 of the base body 2. In a thickness direction of the rotary disk 30, a clearance smaller than the thickness of the coin is formed between the lower surface of the rotary disk 30 and the upper surface of the coin dropped on the bottom surface 3*a* of the circular recess 3. More specifically, in FIG. 4, a protrusion amount of the first push body 34 and the second push body 35, which is directed downward from the lower surface of the rotary disk 30, is set to less than twice the thickness of a coin. Therefore, without passing through the coin catching hole 32 in a state in which two or more coins overlap each other, coins overlapping on the coins dropped on the bottom surface (3*a* in FIG. 3) of the circular recess remain in the coin catching hole 32.

The lower surface of the base body 2 holds a drive unit 50 including a plurality of gears and a fixed shaft. A disk gear 54 that rotates together with the drive shaft 53 about the drive shaft 53 is fixed to the drive shaft 53 of the drive unit 50. In addition to the disk gear 54, the drive unit 50 includes a motor gear 58, a first intermediate gear 57, a second intermediate gear 56, and a third intermediate gear 55.

A motor shaft 71 of the motor 70 fixed to the upper surface side of the base body 2 passes through the base body 2 and protrudes toward the lower surface side. On the lower surface side of the base body 2, the motor gear 58 that rotates together with the motor shaft 71 about the motor shaft 71 is fixed to the motor shaft 71. The motor 70 is a DC motor that can rotate normally and reversely.

The first intermediate gear 57 includes a first small diameter gear 57*a*, a first large diameter gear 57*b*, and a first fixed shaft 57*c*. The first fixed shaft 57*c* is fixed to the lower surface of the base body 2. The first small diameter gear 57*a* and the first large diameter gear 57*b*, which are made of the same member, have a through hole provided at a rotation center position. The first fixed shaft 57*c* passing through the through hole rotatably holds the first small diameter gear 57*a* and the first large diameter gear 57*b*. The first intermediate gear 57 causes the first large diameter gear 57*b* positioned on the upper side among the first small diameter gear 57*a* and the first large diameter gear 57*b* to mesh with the motor gear 58. The first intermediate gear 57 causes the first small diameter gear 57*a* positioned on the lower side to mesh with a second large diameter gear 56*b* of the second intermediate gear 56 to be described later. A rotation drive force of the motor gear 58 is transmitted to the first large diameter gear 57*b* and the first small diameter gear 57*a* at a meshing portion of the motor gear 58 and the first large diameter gear 57*b* of the first intermediate gear 57.

The second intermediate gear 56 includes a second small diameter gear, the second large diameter gear 56*b*, and a second fixed shaft 56*c*. In FIG. 4, the second small diameter gear exists on a back side of the second large diameter gear 56*b*. The second fixed shaft 56*c* is fixed to the lower surface of the base body 2. The second small diameter gear and the second large diameter gear 56*b*, which are made of the same member, have a through hole provided at a rotation center position. The second fixed shaft 56*c* passing through the through hole rotatably holds the second small diameter gear and the second large diameter gear 56*b*. The second intermediate gear 56 causes the second large diameter gear 56*b* positioned on the lower side among the second small diameter gear and the second large diameter gear 56*b* to mesh with the first small diameter gear 57*a* of the first intermediate gear 57. The second intermediate gear 56 causes the second small diameter gear positioned on the upper side to mesh with a third large diameter gear 55*b* of the third intermediate gear 55 to be described later. A rotation drive force of the first small diameter gear 57a and the first large diameter gear 57*b* is transmitted to the second large diameter gear 56*b* and the second small diameter gear at the meshing portion of the first small diameter gear 57*a* and the second large diameter gear 56*b*.

The third intermediate gear 55 includes a third small diameter gear 55*a*, the third large diameter gear 55*b*, and a third fixed shaft 55*c*. The third fixed shaft 55*c* is fixed to the lower surface of the base body 2. The third small diameter gear 55*a* and the third large diameter gear 55*b*, which are made of the same member, have a through hole provided at a rotation center position. The third fixed shaft 55*c* passing through the through hole rotatably holds the third small diameter gear 55*a* and the third large diameter gear 55*b*. The third intermediate gear 55 causes the third large diameter gear 55*b* positioned on the upper side among the third small diameter gear 55*a* and the third large diameter gear 55*b* to mesh with the second small diameter gear of the second intermediate gear 56. The third intermediate gear 55 causes the third small diameter gear 55*a* positioned on the lower side to mesh with the disk gear 54. A rotation drive force of the second small diameter gear and the second large diameter gear 56*b* is transmitted to the third large diameter gear 55*b* and the third small diameter gear 55*a* at the meshing portion of the second small diameter gear and the third large diameter gear 55*b*.

A rotation drive force of the third small diameter gear 55*a* and the third large diameter gear 55*b* is transmitted to the disk gear 54 and the drive shaft 53 at the meshing portion of the third small diameter gear 55*a* and the disk gear 54. A rotation drive force of the drive shaft 53 is transmitted to the rotary disk 30.

The lower surface side of the base body 2 holds a feeding bracket 21 and a pin bracket 12 in addition to the drive unit 50.

At one end portion of the lower surface of the base body 2 in the longitudinal direction, a guide groove 3*h* extending along a track in a circumferential direction about the drive shaft 53 of the drive unit 50 is provided. The feeding bracket 21 is disposed in the guide groove 3*h*. A feeding roller 20 is rotatably provided on an upper surface of one end portion of the feeding bracket 21 in the longitudinal direction. An opening penetrating toward the upper surface of the base body 2 is provided at one end portion of the guide groove 3*h* in the longitudinal direction, and the feeding roller 20 protrudes upward from the upper surface of the base body 2 through the opening. The feeding roller 20 can reciprocate within a length range of the opening in the longitudinal direction. The feeding bracket 21 is biased toward the feeding roller 20 side from a spring 22 side by the spring 22. In a state in which a force is not applied to the feeding roller 20 by a member other than the spring 22, the feeding roller 20 is positioned at an end on a backward movement side (end on the biasing side) in a reciprocating range. Hereinafter, this position is referred to as a home position.

When the feeding roller 20 is at the home position, the feeding roller 20 is closest to the guide roller to be described later. As the feeding roller 20 moves forward from the home position, a distance from the guide roller to be described later increases.

FIG. 5 is a perspective view illustrating the pin bracket 12. The pin bracket 12 includes a main body portion 12*f*, a first fin portion 12*b*, a second fin portion 12*c*, a third fin portion 12*d*, and the guided portion 12*a*. The first fin portion 12*b* is fixed to the main body portion 12*f* in an orientation extending in the circumferential direction about the drive shaft (53 in FIG. 4). On the outer side from the first fin portion 12*b* in the radial direction, the second fin portion 12*c* is fixed to the main body portion 12*f* in an orientation extending in the circumferential direction about the drive axis. On the outer side from the main body portion 12*f* in the radial direction, the third fin portion 12*d* is fixed to the main body portion 12*f* in an orientation extending in the radial direction. A first pin unit 15 is provided on an upper surface of the first fin portion 12*b*. The second pin unit 16 is provided on an upper surface of the second fin portion 12*c*. The guided portion 12*a* is provided on an upper surface of the main body portion 12*f*.

The third fin portion 12*d* is provided with a through hole 12*e*. As illustrated in FIG. 11 to be described later, a male screw 13 passes through the through hole 12*e*. The male screw 13 passing through the through hole 12*e* is fastened to any one of three female screw portions 14 provided on the lower surface of the base body 2 illustrated in FIG. 4. This fastening causes the pin bracket 12 to be fixed to the lower surface of the base body 2.

FIGS. 6A to 6D are plane cross-sectional views for explaining behavior of coins C with a rotation of the rotary disk 30. FIGS. 6A to 6D illustrate cross sections at positions of the first push body 34 and the second push body 35 in a thickness direction of the rotary disk 30 when viewed from above. FIGS. 6A to 6D illustrate a state in which the coins C are caught only in two of the five coin catching holes 32 for convenience, but actually, in most cases, the coins C are caught in all the coin catching holes 32.

When the rotary disk 30 rotates normally (rotates in the clockwise direction in the drawing), the coins C placed on the rotary disk 30 are caught in the coin catching holes 32 while being stirred by a tapered circumferential wall surface around the coin catching holes 32 and the central convex portion 33. The coins C caught in the coin catching holes 32 pass through the coin catching holes 32, fall to the bottom surface (3*a* in FIG. 3) of the circular recess 3, and are pushed to be moved in the normal rotation direction by the first push body 34. At this time, the coins C are moved to the outer side in the radial direction by a centrifugal force without staying directly below the coin catching holes 32, and the side surface of the coins is brought into contact with the circumferential wall 3*b* of the circular recess 3 of the base body 2. The circumferential wall 3*b* guides the movement of the coins C in the rotation direction. A contact pressure of the side surface of the coins with respect to the circumferential wall 3*b* is caused by the centrifugal force in most cases, and thus does not apply a large force.

As illustrated in FIG. 6A, a coin C is moved to a position of an opening portion (hereinafter, referred to as a circumferential wall opening portion) in which a wall does not exist in the circumferential wall 3*b* while being pushed in the normal rotation direction by the first push body 34. At the position of the opening portion of the circumferential wall 3*b*, the coin C is moved outward in a radial direction by the centrifugal force, and a part of the coin C is positioned radially outside a circle having the same curvature as that of the circumferential wall 3*b*.

In the vicinity of an end portion on the upstream side in the normal rotation direction in the opening portion of the circumferential wall 3*b*, a guide roller 17 as a guide member is disposed radially outside a circle having the same curvature as that of the circumferential wall 3*b*. At a position on the downstream side from the guide roller 17 in the normal rotation direction, the feeding roller 20 as a feeding member is disposed radially outside a circle having the same curvature as that of the circumferential wall 3*b*. The guide roller 17 and the feeding roller 20 face each other via the feeding passage (49 in FIG. 3).

After the state illustrated in FIG. 6A, the coin C further pushed in the normal rotation direction by the first push body 34 moves in the normal rotation direction and in a direction directed outward in the radial direction to come into contact with the guide roller 17, and then is guided toward the feeding passage by the guide roller 17. After that, as illustrated in FIG. 6B, the coin C further moves in the normal rotation direction and outward in the radial direction to be separated from the first push body 34, and comes into contact with the second push body 35 to be pushed by the second push body 35. Then, a side surface of the coin C on the downstream side in the normal rotation direction is brought into contact with the feeding roller 20 and the second regulation pin 16*a* in a state in which the side surface of the coin C on the upstream side in the normal rotation direction is brought into contact with the guide roller 17. The second regulation pin 16*a* as a regulation member regulates the movement of the coin C in the normal rotation direction, and guides the coin C outward in the radial direction. In FIG. 6B, the feeding roller 20 is at the home position.

After the state illustrated in FIG. 6B, the coin C further pushed by the second push body 35 further moves outward in the radial direction and is separated from the second regulation pin 16*a* as illustrated in FIG. 6C. At this time, the feeding roller 20 is pushed in a forward movement direction by the coin C, and moves forward as indicated by an arrow in FIG. 6C. In this forward movement, the coin C is pinched between the feeding roller 20 and the guide roller 17.

After the state illustrated in FIG. 6C, when the coin C pushed by the second push body 35 further moves outward in the radial direction, as indicated by a dotted line in FIG. 6D, the feeding roller 20 moves forward to a position in which a distance from the guide roller 17 is substantially equal to a diameter of the coin C. Immediately after this, the feeding roller 20 is forcefully moved backward by the biasing force of the spring (22 in FIG. 4), and returns to an original position. At this time, when the feeding roller 20 ejects the coin C, the coin C is fed outside the device along the feeding passage (49 in FIG. 3) (arrow J in FIG. 16 to be described later). When the coin C passes through the feeding passage, the coin C is detected by the coin detection sensor 41 illustrated in FIG. 3. When the coin C is detected, the coin detection sensor 41 transmits a coin detection signal to a control board.

An example in which only the second regulation pin 16*a* among the first regulation pin 15*a* and the second regulation pin 16*a* regulates the movement of the coin C in the normal rotation direction has been described, but both the first regulation pin 15*a* and the second regulation pin 16*a* as the regulation member regulate the movement of the coin C depending on a size of the coin C. Specifically, when the rotary disk 30 corresponding to a coin larger than the coin C illustrated in FIGS. 6A to 6D is used, both the first regulation pin 15*a* and the second regulation pin 16*a* regulate the movement of the coin in the normal rotation direction.

The control board described above is provided outside the coin hopper 1, and counts the number of coins C based on a coin detection signal transmitted from the coin detection sensor 41. The control board turns on and off a power supplied to the motor 70 illustrated in FIG. 3, and reverses a polarity of a voltage at each of two power supply input terminals of the motor 70. This way, a normal rotation and a reverse rotation of the motor 70 are controlled.

When a situation occurs due to occurrence of a coin jam, in which the forward rotation of the motor 70 is locked and an excessive current flows to a coil of the motor 70 or the coin detection signal is not transmitted from the coin detection sensor 41, the control board executes jam removing processing. In the jam removing processing, the control board repeats a process of performing the reverse rotation and the normal rotation of the motor 70 a predetermined number of times for a predetermined time.

When the rotary disk 30 rotates in the reverse direction, it is necessary to release the regulation of the movement of the coin in the reverse rotation direction by the first regulation pin 15*a* and the second regulation pin 16*a*. Therefore, as illustrated in FIG. 5, in the vicinity of the first regulation pin 15*a*, the first riding pin 15*b* is provided on the downstream side from the first regulation pin 15*a* in the normal rotation direction. In the vicinity of the second regulation pin 16*a*, the second riding pin 16*b* is provided on the downstream side from the second regulation pin 16*a* in the normal rotation direction. An upper end of each of the first riding pin 15*b* and the second riding pin 16*b* has a hemispherical shape. The coin that comes into contact with the first riding pin 15*b* when the rotary disk 30 rotates in the reverse rotation direction rides on the hemispherical upper end of the first riding pin 15*b*, and then rides on the first regulation pin 15*a*. The coin that comes into contact with the second riding pin 16*b* when the rotary disk 30 rotates in the reverse rotation direction rides on the hemispherical upper end of the second riding pin 16*b*, and then rides on the second regulation pin 16*a*.

When changing the size of the coin C to be set in the coin hopper 1, the user at least needs to replace the rotary disk 30 illustrated in FIG. 4, and change the distance between the feeding roller 20 and the guide roller 17 illustrated in FIGS. 6A to 6D. Specifically, it is necessary to provide the coin catching holes 32 having a diameter corresponding to the diameter of the coin C on the rotary disk 30, and use the rotary disk 30 provided with the first push body 34 and the second push body 35 which have a thickness corresponding to the thickness of the coin C. The distance between the feeding roller 20 and the guide roller 17 needs to be changed to a value corresponding to the diameter of the coin C.

In the coin hopper 1 according to the embodiment, the user can change the distance between the feeding roller 20 and the guide roller 17 in a wide range by changing a locking position of the holding unit 18 with respect to the base body 2 illustrated in FIG. 4. Hereinafter, the holding unit 18 will be described in detail.

The holding unit 18 includes a holding body 19 and the guide roller 17. The holding body 19 includes a top plate 19*a*, a first side plate 19*b*, and a second side plate 19*d*. The guide roller 17 is positioned below the top plate 19*a* of the holding body 19, and is rotatably held by the top plate 19*a*. The second side plate 19*d* is positioned on the outer side from the first side plate 19*b* in the radial direction. On an outer surface of the second side plate 19*d*, a second tooth row 19*c* including a plurality of teeth arranged on a track along the circumferential direction centered on the drive shaft 53 of the drive unit 50 is provided.

FIG. 7 is a plan view illustrating one end portion of the coin hopper 1 in a longitudinal direction in a state in which the hopper head (200 in FIG. 1) is removed. The holding unit 18 is fixed to a position on the upstream side from the feeding passage 49 on the upper surface of the base body 2 in the normal rotation direction (clockwise direction in FIG. 7) of the rotary disk 30. A scale 19*e* is provided on the top plate 19*a* of the holding body 19 of the holding unit 18. The scale 19*e* is attached to each tooth of the second tooth row (19*c* in FIG. 4).

The base body 2 is provided with a first tooth row 7 including a plurality of teeth. The plurality of teeth of the first tooth row 7 are arranged on a track along the circumferential direction centered on the drive shaft 53.

FIG. 8 is a plane cross-sectional view illustrating one end portion of the coin hopper 1 in a longitudinal direction. FIG. 8 illustrates a plane cross section of the coin hopper 1 at a position of the first tooth row 7 in a thickness direction of the base body 2 when viewed from the upper surface side of the base body 2. In the base body 2 to which the holding unit 18 is fixed, the first tooth row 7 provided in the base body 2 and the second tooth row 19*c* provided on the second side plate 19*d* of the holding body 19 of the holding unit 18 mesh with each other. When the holding unit 18 is mounted on the base body 2, the user causes the second tooth row 19*c* of the second side plate 19*d* of the holding body 19 to mesh with a plurality of teeth which are at an arbitrary position in the first tooth row 7 while checking the scale (19*e* in FIG. 7) attached to the second tooth row 19*c*. In such an operation, as illustrated in FIG. 9, the user can change the locking position of the holding body 19 with respect to the base body 2 along the track in the circumferential direction centered on the drive shaft 53. When the locking position is changed, the distance between the guide roller 17 held by the holding body 19 and the feeding roller 20 facing the guide roller 17 via the feeding passage 49 is changed.

FIG. 10 is a plan view for explaining a relationship between a position of the guide roller 17 and a direction in which the coin C guided by the guide roller 17 collides with a feeding roller 20. In the drawing, an arrow B indicates a direction in which the coin C guided by the guide roller 17 collides with the feeding roller 20. An arrow A indicates a forward movement direction of the feeding roller 20.

In the coin hopper 1 that changes the locking position of the holding body 19 with respect to the base body 2 along the track in the circumferential direction centered on the drive shaft 53, when the locking position of the holding body 19 is changed, the locking position of the guide roller 17 is also changed along the track in the circumferential direction centered on the drive shaft 53. As illustrated in FIG. 10, in the coin hopper 1 having such a configuration, a direction (arrow B) in which the coin C collides with the feeding roller 20 is substantially constant regardless of the distance between the feeding roller 20 and the guide roller 17 (regardless of the size of the coin C). Furthermore, in the coin hopper 1, by providing the first tooth row 7 at an appropriate relative position with respect to the feeding roller 20, the direction (arrow B) in which the coin C collides with the feeding roller 20 can be set to be substantially the same as the forward movement direction (arrow A) of the feeding roller 20 as illustrated in FIG. 10. In such a coin hopper 1, since the feeding roller 20 with which the coin C collides is smoothly moved in the forward movement direction regardless of the distance between the feeding roller 20 and the guide roller 17, occurrence of the coin jam due to the movement failure of the feeding roller 20 can be suppressed.

In the coin hopper 1 according to the embodiment, a combination of the first tooth row 7, the second tooth row 19*c*, and the like configures locking position changing means. The locking position changing means changes the locking position of the holding body 19 with respect to the base body 2 along the track in the circumferential direction centered on a rotation axis (drive shaft 53) of the rotary disk 30.

A direction in which the holding unit 18 is attached to and detached from the base body 2 is along a tooth width direction of the first tooth row 7 (direction orthogonal to a paper surface of FIG. 10). In such a configuration, the user can remove the holding unit 18 from the base body 2 while releasing the meshing of the first tooth row 7 and the second tooth row 19*c*. The user can mount the holding unit 18 on the base body 2 while meshing the second tooth row 19*c* with the teeth at an arbitrary position of the first tooth row 7. At this time, the user can set the distance between the feeding roller 20 and the guide roller 17 to an arbitrary value without using a dedicated jig by grasping the arbitrary position described above with the scale 19*e*.

As described above, the user can change the size of the coin to be set in the coin hopper 1 by replacing the rotary disk 30 and adjusting the distance between the feeding roller 20 and the guide roller 17. However, when the positions of the first pin unit 15 and the second pin unit 16, which are illustrated in FIG. 5, are constant, a changeable range of the size of the coin is limited.

Therefore, in the coin hopper 1, a locking position of the pin bracket holding the first pin unit 15 and the second pin unit 16 can be changed. Specifically, as illustrated in FIG. 4, the base body 2 is provided with three female screw portions 14 for fixing the pin bracket 12 as a regulation holding body. In FIG. 4, the male screw 13 is screwed into one of three female screw portions 14. The user can change a locking position of the pin bracket 12 with respect to the base body 2 by changing a female screw portion to be fastened to the male screw 13 passing through the through hole 12*e* of the pin bracket 12 among three female screw portions 14.

FIG. 11 is a perspective view for explaining a first example of an attachment state of the pin bracket 12. FIG. 12 is a perspective view for explaining a second example of an attachment state of the pin bracket 12. In the coin hopper 1, a position of the first pin unit 15 and the second pin unit 16 can be changed within a range from the position illustrated in FIG. 11 to the position illustrated in FIG. 12 in the circumferential direction centered on the drive shaft 53. In such a configuration, the changeable range of the size of the coin can be expanded as compared with a configuration in which the positions of the first pin unit 15 and the second pin unit 16 are constant.

When the position of the pin bracket 12 is changed, the guided portion 12*a* is inserted into the position guide hole 3*f* illustrated in FIG. 3. The position guide hole 3*f* guides the position change of the pin bracket 12 along the track in the circumferential direction centered on the drive shaft 53. In this coin hopper, a combination of the guided portion 12*a*, the position guide hole 3*f*, the male screw 13, the three female screw portions 14, the third fin portion 12*d*, the through hole 12*e*, which are illustrated in FIG. 4, and the like configures second locking position changing means. The second locking position changing means changes the locking position of the pin bracket 12 as a regulation holding body with respect to the base body 2 along the track in the circumferential direction centered on the rotation axis (drive shaft 53) of the rotary disk 30.

FIG. 16 is a side view illustrating the coin hopper 1 according to the embodiment. An arrow g in FIG. 16 indicates a gravity direction. An arrow h indicates a horizontal direction. As illustrated in FIG. 16, the coin hopper 1 is mounted on a coin processing apparatus such as a money changer in an orientation in which a bottom surface of the pedestal 80 is aligned in the horizontal direction h. The base body 2 is attached to the pedestal 80 in an orientation in which a longitudinal direction (direction indicated by an alternate long and short dash line in the drawing) of the base body 2 is inclined from the bottom surface of the pedestal 80. Therefore, in the coin processing apparatus, the orientation of the base body 2 is set in which the longitudinal direction is inclined from the horizontal direction h. In the coin hopper 1 according to the embodiment, the coin C is ejected obliquely upward from the inside of the coin hopper 1 as indicated by an arrow J in FIG. 16.

In general, in the coin hopper 1, the size of the base body 2 in the longitudinal direction is the largest among each of the parts. Therefore, in the coin processing apparatus, the orientation of the base body 2 is set in which the longitudinal direction is inclined from the horizontal direction h as described above, so that space saving of installation space of the coin hopper 1 in the horizontal direction h is achieved.

As illustrated in FIG. 9, in the coin hopper 1, a disk circumferential edge 30*b* which is a circumferential edge of the rotary disk 30 has a ring shape having a flat surface extending straight in the radial direction. The reason why the disk circumferential edge 30*b* has a flat surface extending straight in the radial direction is that a thickness capable of exhibiting a desired strength is required for a circumferential wall portion of the rotary disk 30.

FIG. 13 is a cross-sectional view illustrating a hopper head 400 and the rotary disk 300 of the coin hopper according to a comparative example not including a certain aspect of the present invention. When the rotary disk 300 is made of a resin material, there is an advantage that a weight of the rotary disk 300 can be reduced, but there is a disadvantage that a width of the circumferential edge of the ring-shaped disk is increased in order to secure strength.

In the rotary disk 300, the reason why the increase in the width of the circumferential edge of the ring-shaped disk is disadvantageous is as follows. That is, when the coin hopper 1 is mounted on the coin processing apparatus in the orientation in which the longitudinal direction of the base body 2 is inclined from the horizontal direction h, as illustrated in FIG. 13, the orientation of the rotary disk 300 is set in which the radial direction is inclined from the horizontal direction h. Then, the coin C may remain on a circumferential wall surface of a circular opening 403 of the hopper head 400. Specifically, as illustrated in FIG. 13, the coin C may come into contact with a region positioned at the lowermost portion in the gravity direction in the entire region of the circumferential wall surface of the circular opening 403 in a facing orientation. The coin C in such an orientation stays in the lowermost region on the circumferential wall surface of the circular opening 403 by the action of gravity while a side surface of the coin is rubbed against the circumferential edge of the ring-shaped disk without following the rotating rotary disk 300. Then, the control board erroneously detects that all of the coins C have been fed based on a fact that the coin detection signal has not been received from the coin detection sensor (41 in FIG. 3) for more than a certain period of time even though the normal rotation of the rotary disk 300 is continued. In the coin hopper that is required to accurately count the number of coins C, the erroneous detection is a great disadvantage.

In addition to the coin hopper of the comparative example illustrated in FIG. 13, the coin output device described in Patent Literature 1 also has a problem that the coin C may remain on the circumferential wall surface of the circular opening of the coin collecting funnel.

Therefore, an object of the present invention is to provide a disk feeding device capable of preventing a disk from remaining on a circumferential wall surface of a circular opening of a storage portion (hopper head 200 in the embodiment) such as a coin collecting funnel.

In order to achieve such an object, the present invention provides a disk feeding device including: a base body; a storage portion that stores a disk; a rotary member that is disposed in the base body and is rotatable; a feeding passage that is provided in the base body and through which the disk fed toward an outside of a device passes; and a guide member and a feeding member that are face each other via the feeding passage, in which the rotary member includes a circular through hole that penetrates in a rotation axis direction and a push portion that pushes the disk in a rotation direction to move the disk, and moves the disk sent to the rotary member from the storage portion and passing through the through hole with the push portion in the rotation direction, the guide member guides the disk moved to a predetermined position of the rotation direction toward the feeding passage, the feeding member is capable of reciprocating in a direction in which a distance from the guide member is changed, and feeds the disk pinched between the feeding member and the guide member by a biasing force of a biasing member while being biased toward the guide member by the biasing member, and a bottom portion of the storage portion includes a taper, a circular opening provided so as to continue to a lower end of the taper and facing the rotary member, and a protrusion provided in a lowermost region in a circumferential direction of a circumferential wall surface of the circular opening.

The coin hopper 1 according to the embodiment can achieve the above-described object.

FIG. 14 is a cross-sectional view illustrating the hopper head 200 and the rotary disk 30 of the coin hopper 1 according to the embodiment. In this coin hopper 1, a taper 36 descending from the outer side to the inner side in the radial direction is provided on the disk circumferential edge of the rotary disk 30. In the hopper head 200, the coin set in an orientation facing the lowermost region in the gravity direction g in the entire circumferential region of the circumferential wall of the circular opening 203 moves further downward while sliding on a surface of the taper 36 and falls to the upper surface of the rotary disk 30 or into the coin catching hole 32. This falling prevents the coin from remaining in the lowermost region on the circumferential wall surface of the circular opening 203.

On the circumferential wall of the circular opening 203 of the hopper head 200, a plurality of protrusions 205 arranged at a predetermined interval in the circumferential direction is provided in a part of the region in the circumferential direction. One of the plurality of protrusions 205 is provided in a region positioned on the lowermost side of the circumferential wall surface of the circular opening 203. Hereinafter, the protrusion 205 provided in the region positioned on the lowermost side of the circumferential wall surface of the circular opening 203 is referred to as a lowermost protrusion 205.

FIG. 17 is a cross-sectional view of the coin hopper 1. In FIG. 17, illustration of the motor (70 in FIG. 16) is omitted. As illustrated in FIG. 17, the lowermost protrusion 205 comes into contact with the coin C to prevent the coin from adhering to the circumferential wall surface of the circular opening 203, and guides a lower portion of the coin C of the gravity direction g toward the coin catching hole 32 of the rotary disk 30. In the guiding, the coin C is smoothly caught in the coin catching hole 32 of the rotary disk 30, thereby preventing the coin from remaining in the lowermost region of the circular opening 203 better in the vicinity of the lowermost region on the circumferential wall of the circular opening 203 in the gravity direction g.

It is desirable that the shape of the protrusion 205 is a shape having a taper descending from a center of the protrusion 205 toward the outer edge at least on each of opposite sides of the protrusion 205 in a direction along a central axis of the circular opening 203 and opposite sides of the protrusion 205 in a direction perpendicular to the central axis of the circular opening 203. Examples of the above-described shape include a conical shape, a polygonal pyramid shape, a hemispherical shape, and the like, and the hemispherical shape without a corner is most preferable. In the coin hopper 1 according to the embodiment, as illustrated in FIG. 1, the hemispherical shape is adopted as the shape of the protrusion 205. By forming the protrusion 205 into a tapered shape as described above, it is possible to prevent the coin C from being caught by the protrusion 205.

Hereinafter, a modification example in which a partial configuration of the coin hopper 1 according to the embodiment is modified to another configuration will be described. The configuration of the coin hopper 1 according to the modification example is the same as that of the embodiment unless otherwise noted below.

FIG. 15 is a plan view illustrating one end portion of a coin hopper 1 according to a modification example in a longitudinal direction. In the coin hopper 1 according to the modification example, the base body 2 does not include the first tooth row, and instead of this, the base body 2 includes a rotatable gear 27 that meshes with the second tooth row (19*c* in FIG. 8) of the holding body 19. A recess 27*a* into which a tool such as a screwdriver is inserted is provided at a center of the gear 27. The user can change the locking position of the holding body 19 with respect to the base body 2 by rotating the gear 27 by using the tool inserted into the recess.

Although the preferred embodiments and modification examples of the present invention have been described above, the present invention is not limited to these embodiments and modification examples, and various modifications and changes can be made within the scope of the gist of the present invention. These embodiments and modification examples are included in the scope and the gist of the invention, and are also included in the invention described in the claims and the equivalent scope thereof.

The present invention has unique effects for each of the following aspects.

First Aspect

According to a first aspect, there is provided a disk feeding device (for example, a coin hopper 1) including: a base body (for example, a base body 2); a storage portion (for example, a hopper head 200) that stores a disk (for example, a coin C); a rotary member (for example, a rotary disk 30) that is disposed in the base body and is rotatable; a feeding passage (for example, a feeding passage 49) that is provided in the base body and through which the disk fed toward an outside of the device passes; and a guide member (for example, a guide roller 17) and a feeding member (for example, a feeding roller 20) that face each other via the feeding passage, in which the rotary member includes a circular through hole (for example, a coin catching hole 32) that penetrates in a rotation axis direction and a push portion (for example, a first push body 34 and a second push body 35) that pushes the disk in a rotation direction to move the disk, and moves the disk sent to the rotary member from the storage portion and passing through the through hole with the push portion in the rotation direction, the guide member guides the disk moved to a predetermined position of the rotation direction toward the feeding passage, the feeding member is capable of reciprocating in a direction in which a distance from the guide member is changed, and feeds the disk pinched between the feeding member and the guide member by a biasing force of a biasing member (for example, a spring 22) while being biased toward the guide member by the biasing member, the disk feeding device including a holding body (for example, a holding body 19) that holds the guide member, and locking position changing means (for example, a combination of a first tooth row 7, a second tooth row 19*c*, and the like) for changing a locking position of the holding body with respect to the base body along a track in a circumferential direction centered on the rotation axis.

In the first aspect, regardless of the distance between the feeding member and the guide member (regardless of a size of the disk), a direction in which the disk guided by the guide member collides with the feeding member is set to be substantially constant. Furthermore, in the first aspect, by setting a relative position between the locking position changing means and the feeding member, the direction in which the disk guided by the guide member collides with the feeding member can be set to be substantially the same as the forward movement direction of the feeding member. In the first aspect, since the feeding member with which the disk collides is smoothly moved in the forward movement direction regardless of the distance between the feeding member and the guide member, occurrence of the coin jam due to the movement failure of the feeding member can be suppressed.

Second Aspect

According to a second aspect, in the first aspect, a first tooth row (for example, a first tooth row 7) including a plurality of teeth arranged at a predetermined interval along the track is provided in the base body, a second tooth row (for example, a second tooth row 19*c*) that includes a plurality of teeth and meshes with the first tooth row is provided in the holding body, and the holding body is configured to be capable of being attached to and detached from the base body in a tooth width direction of the first tooth row.

In the configuration, the user can remove the holding body from the base body while releasing the meshing of the first tooth row provided in the base body and the second tooth row provided in the holding body. The user can mount the holding body on the base body while meshing the second tooth row provided in the holding body with the teeth at an arbitrary position of the first tooth row provided in the base body.

Third Aspect

According to a third aspect, in the first aspect, a tooth row including a plurality of teeth arranged at a predetermined interval along the track is provided in the holding body, a gear (for example, a gear 27) meshing with the tooth row is provided in the base body, and the locking position changing means includes at least the tooth row and the gear.

In the configuration, the user can adjust the distance between the feeding member and the guide member with a simple operation of turning the gear.

Fourth Aspect

According to a fourth aspect, in the second aspect or the third aspect, a scale (for example, a scale 19*e*) is provided on the first tooth row or the tooth row.

In the configuration, the user can set the distance between the feeding member and the guide member to an arbitrary value without using a dedicated jig by grasping a target attachment position of the holding body with respect to the base body by using the scale.

Fifth Aspect

According to a fifth aspect, in any one of the first aspect to the fourth aspect, a regulation member (for example, a first regulation pin 15*a* and a second regulation pin 16*a*) that guides the disk toward the feeding passage in a radial direction while coming into contact with the disk pushed by the push portion and moved in the rotation direction to regulate a movement of the disk in the rotation direction; a regulation holding body (for example, a pin bracket 12) that holds the regulation member; and second locking position changing means (for example, a combination of a guided portion 12*a*, a position guide hole 3*f*, a male screw 13, a female screw portion 14, a third fin portion 12*d*, a through hole 12*e*, and the like) for changing a locking position of the regulation holding body with respect to the base body along a track in a circumferential direction centered on the rotation axis are further provided.

In the configuration, the changeable range of the size of the disk set in the disk feeding device can be expanded as compared with a configuration in which a position of the regulation member is set to be constant.

Sixth Aspect

According to a sixth aspect, in any one of the first aspect to the third aspect, a taper (for example, a taper 36) descending from an outer side to an inner side in a radial direction is provided on an edge of the rotary member centered on the rotation axis.

In the configuration, the disk set in an orientation facing the lowermost region in the gravity direction in the entire circumferential region of the circumferential wall of the storage portion moves further downward while sliding on a surface of the taper provided on an edge of the rotary member and falls to the upper surface of the rotary member or into the through hole. In the sixth aspect, according to the falling of the disk, by preventing the disk from remaining in the lowermost region on the circumferential wall surface of the storage portion, the decrease in counting accuracy of the disk due to the remaining of the disk can be suppressed.

Seventh Aspect

According to a seventh aspect, in the sixth aspect, a bottom portion of the storage portion includes a taper (for example, a taper 202), a circular opening (for example, a circular opening 203) continuing to a lower end of the taper, and a protrusion (for example, a protrusion 205) provided in a lowermost region in a circumferential direction of a circumferential wall surface of the circular opening.

In the configuration, the protrusion provided on the circumferential wall surface of the circular opening comes into contact with the disk to prevent the disk from adhering to the circumferential wall surface of the circular opening, so that the disk in the region on the lowermost stream side of the circumferential wall surface is prevented from remaining more favorably. Therefore, in the seventh aspect, the decrease in counting accuracy of the disk due to the remaining of the disk in the lowermost region on the circumferential wall surface of the storage portion can be suppressed.

INDUSTRIAL APPLICABILITY

The present invention can be suitably used for, for example, a disk feeding device and a disk processing device including the disk feeding device.

This application claims priority based on Japanese Patent Application No. 2018-226971 filed on Dec. 4, 2018, the entire contents of which are incorporated herein by reference.

REFERENCE SIGNS LIST

1 coin hopper (disk feeding device)
2 base body
3*f* position guide hole
7 first tooth row
12 pin bracket (regulation holding body)
12*a* guided portion
12*d* third fin portion
12*e* through hole
13 male screw
14 female screw portion
15*a* first regulation pin (regulation member)
16*a* second regulation pin (regulation member)
17 guide roller (guide member)
19 holding body
19*c* second tooth row
19*e* scale
20 feeding roller (feeding member)
27 gear
30 rotary disk (rotary member)
32 coin catching hole (through hole)
34 first push body (push portion)
35 second push body (push portion)
49 feeding passage
200 hopper head (storage portion)
202 taper
203 circular opening
205 protrusion
C coin (disk)

The invention claimed is:

1. A disk feeding device including:

a base body;

a hopper head that stores a disk;

a rotary disk that is disposed in the base body and is rotatable;

a feeding passage that is provided in the base body and through which the disk fed toward an outside of the disk feeding device passes; and a guide roller and a feeding member that face each other via the feeding passage, the rotary disk including a circular through hole that penetrates in a rotation axis direction and a push protrusion that pushes the disk in a rotation direction to move the disk, and moving the disk that is sent to the rotary disk from the hopper head and passes through the through hole with the push protrusion in the rotation direction, the guide roller guiding the disk moved to a predetermined position of the rotation direction toward the feeding passage, the feeding member being capable of reciprocating in a direction in which a distance from the guide roller is changed, and feeding the disk pinched between the feeding member and the guide roller by a biasing force of a biasing member while being biased toward the guide roller by the biasing member, the disk feeding device comprising:

a holder that holds the guide roller;

a first lock for changing a locking position of the holder with respect to the base body along a track in a circumferential direction centered on the rotation axis;

regulation pins that guide the disk toward the feeding passage in a radial direction while coming into contact with the disk pushed by the push protrusion and moved in the rotation direction to regulate a movement of the disk in the rotation direction;

a pin bracket that holds the regulation pins; and a second lock for changing a locking position of the pin bracket with respect to the base body along a track in a circumferential direction centered on the rotation axis.

2. The disk feeding device according to claim 1, wherein a first tooth row including a plurality of teeth arranged at a predetermined interval along the track is provided in the base body, a second tooth row that includes a plurality of teeth and meshes with the first tooth row is provided in the holder, and the holder is configured to be capable of being attached to and detached from the base body in a tooth width direction of the first tooth row.

3. The disk feeding device according to claim 1, wherein a tooth row including a plurality of teeth arranged at a predetermined interval along the track is provided in the holder, a gear meshing with the tooth row is provided in the base body, and the first lock includes at least the tooth row and the gear.

4. The disk feeding device according to claim 2, wherein a scale is provided on the second tooth row.

5. The disk feeding device according to claim 1, wherein a taper descending from an outer side to an inner side in a radial direction is provided on an edge of the rotary disk centered on the rotation axis.

6. The disk feeding device according to claim 5, wherein a bottom portion of the hopper head includes a taper, a circular opening continuing to a lower end of the taper, and a protrusion provided in a lowermost region in a circumferential direction of a circumferential wall surface of the circular opening.

7. The disk feeding device according to claim 3, wherein a scale is provided on the tooth row.

* * * * *